US008180621B2

(12) United States Patent
Phillips

(10) Patent No.: US 8,180,621 B2
(45) Date of Patent: May 15, 2012

(54) PARAMETRIC PERTURBATIONS OF PERFORMANCE METRICS FOR INTEGRATED CIRCUITS

(75) Inventor: Joel Reuben Phillips, Oakland, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 724 days.

(21) Appl. No.: 12/209,782

(22) Filed: Sep. 12, 2008

(65) Prior Publication Data

US 2009/0228250 A1    Sep. 10, 2009

Related U.S. Application Data

(60) Provisional application No. 60/972,420, filed on Sep. 14, 2007.

(51) Int. Cl.
*G06F 17/50* (2006.01)
(52) U.S. Cl. .................. 703/14; 703/23; 703/6; 716/50; 716/108; 716/133; 716/134
(58) Field of Classification Search .......... 703/2, 13–19; 716/113, 103
See application file for complete search history.

(56) References Cited

U.S. PATENT DOCUMENTS

| 6,349,272 | B1 * | 2/2002 | Phillips ............................ | 703/2 |
| 7,035,782 | B2 * | 4/2006 | Yang et al. ...................... | 703/14 |
| 7,882,471 | B1 * | 2/2011 | Kariat et al. ................... | 716/113 |
| 2006/0265680 | A1 * | 11/2006 | Scheffer et al. .................. | 716/9 |

OTHER PUBLICATIONS

Zhenhai Zhu, Luis Silva, Joel Phillips, Miguel Silveira Variation-Aware, Library Compatible Delay Modeling Strategy IFIP, 3-901882-19-7, Oct. 16, 2006.*
C. Visweswariah, K. Ravindran, K. Kalafala, S. G. Walker, and S. Narayan. First-order incremental block-based statistical timing analysis. In Proceedings of the ACM/IEEE Design Automation Conference, pp. 331-336, San Diego, CA, Jun. 2004.
Aseem Agarwal, David Blaauw, and Vladimir Zolotov. Statistical Timing Analysis using Bounds and Selective enumeration. IEEE Transaction on CAD, 22:1243-1260, Sep. 2003.
H. Chang and S.S. Sapatnekar. Statistical Timing Analysis Considering Spatial Correlations using a Single Pert-like Traversal. In Proceedings of the International Conference on Computer Aided-Design, pp. 621-625, San Jose, CA, Nov. 2003.
R. Telichevesky and K. Kundert and J. White, "Efficient AC and noise analysis of twotone RF circuits," Proceedings of 33rd Design Automation Conference, Las Vegas, Nevada, Jun. 1996.

(Continued)

*Primary Examiner* — Kamini S Shah
*Assistant Examiner* — Cuong Luu
(74) *Attorney, Agent, or Firm* — Schwegman, Lundberg & Woessner, P.A.

(57) ABSTRACT

A method of simulating parametric variations in an integrated circuit (IC) includes: specifying an IC model, wherein the IC model includes one or more parameters for variation about a nominal condition; calculating parametric perturbations about the nominal condition; and saving one or more values for the parametric perturbations in a computer-readable medium. Calculating the parametric perturbations includes: simulating the nominal condition for the IC; determining perturbation values for the IC model about the nominal conditions, wherein the perturbation values include linear time-varying matrices and parametric right-hand sides, determining a performance metric for the IC and a performance sampling vector for sampling the performance metric about the nominal condition from the perturbation values; and determining voltage-sensitivity values and performance-sensitivity values from the perturbation values and the performance-sampling vector.

23 Claims, 9 Drawing Sheets

OTHER PUBLICATIONS

Lou Scheffer. Explicit Computation of Performance as a Function of Process Variation. In International Workshop on Timing Issues in the Specification and Synthesis of Digital Systems, Monterey, CA, Dec. 2002.

Aniruhd Devgan and Chandramouli Kashyap. Block-based Static Timing Analysis with Uncertainty. In Proceedings of the International Conference on Computer Aided-Design, pp. 607-614, San Jose, CA, Nov. 2003.

Aseem Agarwal, David Blaauw, and Vladimir Zolotov. Statistical clock skew Analysis considering intradie-process variations. IEEE Transaction on CAD, 23:1231-1241, Aug. 2004.

J. Wang, P. Ghanta, and S. Vrudhula. Stochastic analysis of interconnect performance in the presence of process variations. In International Conference on Computer Aided-Design, pp. 880-886, San Jose, CA, Nov. 2004.

Joel R. Phillips. Variational interconnect analysis via PMTBR. In International Conference on Computer Aided-Design, pp. 872-879, San Jose, CA, Nov. 2004.

X. Li, P. Li, and L. Pileggi. Parameterized interconnect order reduction with Explicitand- Implicit multi-Parameter moment matching for Inter/Intea-Die variations. In International Conference on Computer Aided-Design, pp. 806-812, San Jose, CA, Nov. 2005.

James D. Ma and Rob A. Rutenbar. Interval-valued reduced order statistical interconnect modeling. In Proc. Int. Conf. on Computer Aided Design, 2004.

Z. Wang, R. Murgai, and J. Roychowdhury. ADAMIN: Automated, accurate macromodelling of digital aggressors for power and ground supply noise prediction. IEEE Transaction on CAD, 24:56-64, Jan. 2005.

K. Okada, K. Yamaoka, and H. Onodera. A statistical gate-delay model considering intragate variability. In Proceedings of the International Conference on Computer Aided-Design, pp. 908-913, San Jose, CA, Nov. 2003.

A. Papoulis. Probability, random variables, and stochastic processes. McGraw Hill, New York, 1991.

Roger A. Horn and Charles R. Johnson. Matrix Analysis. Cambridge University Press, Cambridge, 1985.

Joel R. Phillips. Projection-based approaches for model reduction of weakly nonlinear, time-varying systems. IEEE Trans. Computer-Aided Design, 22:171-187, 2003.

L. Scheffer, L. Luciano and G. Martin, eds., EDA for IC Implementation, Circuit Design, and Process Technology, Chapter 14, Simulation of Analog and RF Circuits and Systems, by J. Roychowdhury and A. Mantooth, pp. 14-1 to 14-38, CRC Press, 2006.

M.J.M. Pelgrom, Aad C.J. Duinmaijer and Anton P.G. Welbers, "Matching Properties of MOS Transistors," IEEE Journal of Solid-State Circuits, vol. 24, No. 5, Oct. 1989, pp. 1433-1440.

Francesco Forti and Michael E. Wright, "Measurement of MOS Current Mismatch in the Weak Inversion Region," IEEE Journal of Solid-State Circuits, vol. 29, No. 2, Feb. 1994, pp. 138-142.

Jaeha Kim, Kevin D. Jones and Mark A. Horowitz, "Fast, Non-Monte-Carlo Estimation of Transient Performance Variation Due to Device Mismatch," Design Automatic Conference, Jun. 4-8, 2007, Association for Computing Machinery, Inc., pp. 440-443.

\* cited by examiner

| Params | Measurements | CPU/Fit | CPU/Analytic | Speedup |
|---|---|---|---|---|
| 2 | 1 | 4 | 1.7 | 2.4X |
| 676 | 1 | 1353 | 5.6 | 242X |
| 676 | 128 | 1353 | 13.3 | 102X |

FIG. 6

PARAMETRIC PERTURBATIONS OF PERFORMANCE METRICS FOR INTEGRATED CIRCUITS

CROSS-REFERENCE TO RELATED APPLICATIONS

This application claims the benefit of U.S. Provisional Application No. 60/972,420, filed Sep. 14, 2007, and incorporated herein by reference in its entirety.

BACKGROUND OF THE INVENTION

1. Field of Invention

The present invention relates to integrated circuits and more particularly to parametric perturbation analysis of performance metrics for integrated circuits, especially for applications related to statistical timing analysis of combinational logic cells.

2. Description of Related Art

The problem of digital circuit (static) timing analysis under statistical process variation has recently received considerable attention from the academic community. Numerous approaches to "statistical timing" of general combinational logic circuits [1, 2, 3, 5, 6] as well as specialized cases such as clock networks [7] have been proposed. With increasing importance of process variation effects, the hope is that by moving to statistically based methods, as opposed to corner-based methodologies, several advantages will be gained. By means of more realistic timing analysis, an overly pessimistic design due to unrealistic rare corner cases can be avoided. Particularly when considering interconnect variation and inter-die variation, the number of corners that must be analyzed can be very large, leading to excessive analysis times. Finally, some problems due to intra-die variation are difficult to capture at all in a purely corner-based methodology.

In some operational settings black-box techniques such as response surface models (RSMs) have been applied to problems in statistical static timing analysis [13]. However these methods are often ill-suited to problems where a large number (>>10) of independent process variables are involved. An example of such a case is MOS parameter mismatch, where parameters can vary stochastically from device to device, leading to several independent variables per transistor. An example at the path or block level of analysis is intra-die variation in interconnect, because of the potentially large number of interconnect layers.

Before the advantages of statistical timing can be realized, the underlying components of the digital timing analysis flow—parasitic extraction, cell characterization, cell delay computation, and interconnect reduction—must be evolved to suit the requirements of the new timing analyzers [1]. Some work has appeared along this line; for example, several approaches have been proposed for interconnect reduction under process variation [8, 9, 10, 11]. However, problems related to cell library generation and related parametric variations have received relatively little attention.

Thus, there is a need for improved methods for analyzing parametric perturbations of performance metrics for integrated circuits, especially for applications related to statistical timing analysis of combinational logic cells.

SUMMARY OF THE INVENTION

In one embodiment of the present invention, a method of simulating parametric variations in an integrated circuit (IC) includes: specifying an IC model, wherein the IC model includes one or more parameters for variation about a nominal condition; calculating parametric perturbations about the nominal condition; and saving one or more values for the parametric perturbations in a computer-readable medium. Calculating the parametric perturbations includes: simulating the nominal condition for the IC; determining perturbation values for the IC model about the nominal conditions, wherein the perturbation values include linear time-varying matrices and parametric right-hand sides, determining a performance metric for the IC and a performance sampling vector for sampling the performance metric about the nominal condition from the perturbation values; and determining voltage-sensitivity values and performance-sensitivity values from the perturbation values and the performance-sampling vector.

According to one aspect of this embodiment, the performance metric may measure delay for a waveform and the performance sampling vector may sample waveform values to measure the delay.

According another aspect, simulating the nominal condition for the IC may include approximating IC behavior on a discrete temporal grid.

According another aspect, the linear time-varying matrices may include capacitance values and conductance values.

According another aspect, the parametric right-hand sides may include source functions corresponding to parametric variations.

According another aspect, the performance-sampling vector may correspond to a reference voltage value that crosses a threshold voltage value.

According another aspect, determining the voltage sensitivity values and performance sensitivity values may include solving a system that relates values of the linear time-varying matrices to the parametric right-hand sides.

According another aspect, calculating the parametric perturbations may further include determining a performance value from the performance sensitivity.

According another aspect, the perturbation values for the IC model may include a first-order system that is driven by source functions that correspond to the parametric perturbations and a second-order system that is driven by a solution of the first-order system; and determining the voltage-sensitivity values may include solving the first-order system for a first-order voltage sensitivity and using the first-order voltage sensitivity to solve the second-order system for a second-order voltage sensitivity.

According another aspect, the perturbation values for the IC model may include a first-order system that is driven by source functions that correspond to the parametric perturbations and a second-order system that is driven by a solution of the first-order system; and determining the performance-sensitivity values may include solving the first-order system for a first-order voltage sensitivity, solving an adjoint first-order system for a performance-sampling sensitivity corresponding to the performance-sampling vector, and calculating a second-order performance sensitivity by using the second-order system to combine the first-order voltage sensitivity and the performance-sampling sensitivity.

In another embodiment of the present invention, a method for simulating parametric variations in an integrated circuit includes: creating a circuit schematic, creating a netlist from the circuit schematic, specifying device parameters to be varied, calculating parametric perturbations, and outputting the results of the parametric perturbations. The above described method can be applied to both linear and nonlinear models.

According to one aspect of this embodiment in the case of a linear model for delays, calculating the parametric perturbations includes: simulating a nominal condition for the circuit, calculating LTV (Linear Time Varying) matrices, calculating one or more parametric RHS (Right-Hand Side(s)), calculating adjoint matrices; calculating one or more adjoint RHS vectors, calculating voltage sensitivities, calculating delay sensitivities, and calculating delay values for the parametric variations.

According to one aspect in the case of a nonlinear model for delays, calculating the parametric perturbations includes: simulating a nominal condition for the circuit, calculating LTV matrices, calculating one or more parametric RHS (Right-Hand Side(s)), calculating adjoint matrices, calculating forward sensitivities, calculating one or more adjoint RHS vectors, calculating voltage sensitivities, calculating perturbations at the crossing points, and calculating delay values for the parametric variations.

Additional embodiments relate to an apparatus for carrying out any one of the above-described methods, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out any one of the above-described methods with a computer. In these ways the present invention enables improved methods for analyzing parametric perturbations of performance metrics for integrated circuits, especially for applications related to statistical timing analysis of combinational logic cells.

BRIEF DESCRIPTION OF THE DRAWINGS

FIG. 6 shows normalized simulation times for network sensitivity analysis for an embodiment of the present invention.

DETAILED DESCRIPTION OF EXEMPLARY EMBODIMENTS

1. Modeling Background

Figure 1:
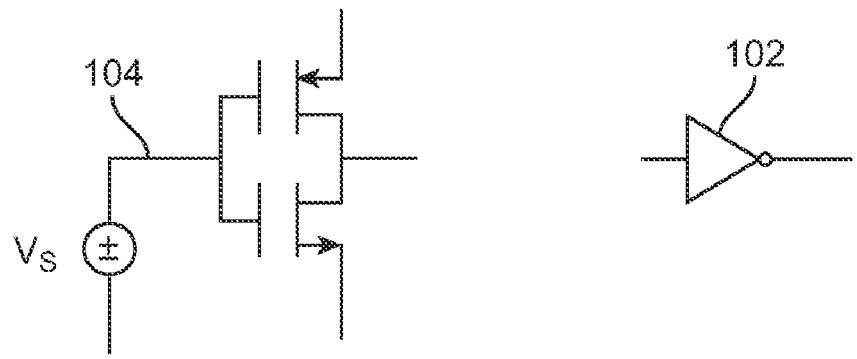
FIG. 1 shows an exemplary inverter.

In general, digital circuits are strongly nonlinear with respect to the circuit inputs. However, except for some extreme cases, cell delays are often close to linear with respect to process parameters. Thus, for purposes of characterizing first-order statistical timing, under most conditions digital cells and paths can be well described by linear time-varying (LTV) perturbation theory, which has, for example, been applied to the analysis of power supply noise [12]. As discussed below, an application of LTV perturbation theory leads directly to cell delay models in the first-order canonical form [1, 5]. Related embodiments of the present invention enable dynamic statistical timing analysis of moderate sized circuit blocks, or critical paths, at a cost comparable to a single nominal analysis. In certain related embodiments, mismatch analysis of dynamic circuit effects can be performed, again at cost comparable to a single transient simulation, and without the commonly used device of adding extra fictitious circuit elements as is common practice [18,19].

1.1. Statistical Timing Models

Certain approaches to statistical timing express all quantities in the timing graph in a "first-order canonical form":

$$D_g = a_0 + \Sigma a_k \Delta X_k + a_{n+1} \Delta R_a, \quad (1)$$

where the $\Delta X_k$ are independent, zero-mean Gaussian random variables representing global sources of variation, $\Delta R_a$ is an independent random variable unique to each timing quantity, and $D_g$ is a (gate) delay. This form allows tracing the impact of particular sources of process variation, and preserves the effect of correlation between the global process variables. It should be clear that less rich delay models (for example, simple mean/variance for each delay) can be simply derived from this form.

From the point of view of cell characterization Eq. (1) seeks to represent the cell delay as an affine function of the variables $\Delta X_k$ and $\Delta R_a$. Given that the function form of the delay is known as a function of the variables, within the approximation of Eq. (1) the coefficients may be computed as $$a_k = \frac{\partial D_g}{\partial \Delta X_k} k = 1, \ldots, n. \quad (2)$$

Thus, the cell characterization problem can be reduced to the efficient computation of the sensitivity of gate delays to (a possibly large number of) independent process parameters. In the case where gates are characterized for purely random sources of variation, for example, for threshold voltage mismatch due to channel dopant fluctuations, computation of the coefficient $a_{n+1}$ is similar, and can be done by computing the sensitivity of the delay to each individual source of variation and summing the propagated variances (cf. discussion of "Statistical Sensitivity Analysis" below). Theoretically, this is a straightforward proposition; however, a careful choice of numerical methods can result in practical advantages over some more obvious implementations.

1.2. Statistical Cell Characterization

The traditional cell characterization process consists of performing many, many transistor-level (i.e., SPICE) simulation runs, each for a different set of input and loading conditions, for each cell to be characterized. From each simulation run, the time difference between the transition of the simulation waveform on the cell input and transition of the output is computed and tabulated as the delay for that cell under the given stimulus conditions. Slews are characterized similarly.

The most obvious way to obtain parametric models of the form given by Eq. (1) is by finite-difference approximations to differentiation. This procedure involves, for each parameter in turn, perturbing the parameter in the SPICE model or netlist, re-running the simulation to obtain a perturbed delay, subtracting the two, and dividing by the parameter perturbation to obtain an estimate of the derivative in Eq. (2). There are two primary problem with this simple procedure. The first is obvious: when there are many parameters, many additional simulation runs need to be performed, greatly increasing the cost of characterization. The second problem is less widely appreciated but more problematic. Because of various complex implementation details in the simulator (e.g., adaptive time-step control), the delays obtained from the perturbation procedure are not necessarily continuous, and they may contain some numerical simulation "noise." This means that good derivative estimates cannot always be obtained from two-point measurements. To remedy this requires increasing the number of measurement points (i.e., parameter values) and least-squares fitting a line. If, for example, four extra points are needed per parameter, and there are, say, ten global parameters, the characterization cost has increased by 40×, which is unacceptable. More sophisticated curve-fitting methods (e.g., "response-surface models," [13]) have similar runtime issues that have precluded efficiently handling large numbers of parameters, as may occur for mismatch analysis in analog designs, and optical proximity effects in extreme subwavelength lithography.

2. Robust Model Extraction

In this section we address the core model extraction problem. Within the framework of the first-order canonical model, it is sufficient to describe computation of the sensitivity of cell or path delay to a process parameter. The problem of computing delay sensitivity can be reduced to the problem of computing waveform sensitivity at a few select points on the circuit waveforms.

2.1. Linear Time-Varying Perturbation Analysis

First we will develop the basic circuit analysis of linear, but parametrically varying, systems via time-varying perturbation theory. Linear time-varying perturbation theory is a type of small-signal analysis that is able to treat circuits that are strongly nonlinear with respect to one or more inputs, but weakly nonlinear with respect to another perturbation such as a change in a process parameter. This approach assumes that the range of parameter variation is "small."

As starting point, we assume the existence of a set of nonlinear differential-algebraic equations whose topology is fixed, but whose constitutive relations depend on a continuous way on a set of parameters. Without loss of generality the basic circuit equations can be written as $$\frac{d}{dt} q(v, \lambda) + i(v, \lambda) = u(t) \quad (3)$$

where v represents the circuit state variables, for example, node voltages, q represents dynamic quantities such as stored charge, i represents static quantities such as device currents, t represents time, and u(t) represents independent inputs such as current and voltage sources. In departure from the usual case, we introduce a p-element parameter vector $\lambda \in \mathcal{R}^p$. These parameters represent properties such as transistor threshold voltage and channel length that induce variation in the circuit behavior through the q and i functions. Note that at this point we have not made any specific assumptions about the nature of the variables $\lambda$. In particular we will not distinguish between the case where $\lambda$ describes a set of random variables, or not.

Let us define a local perturbation:

$$\lambda = \lambda_0 + \Delta\lambda \quad (4)$$

$$v = v_0 + \Delta v \quad (5)$$

Assume we can expand the i, q functions in series of $\Delta\lambda$ and $\Delta v$ $$q(v, \lambda) = q(v_0, \lambda_0) + \frac{\partial q}{\partial \lambda}\Delta\lambda + \frac{\partial q}{\partial v}\Delta v \quad (6)$$

$$i(v, \lambda) = i(v_0, \lambda_0) + \frac{\partial i}{\partial \lambda}\Delta\lambda + \frac{\partial i}{\partial v}\Delta v \quad (7)$$

Assuming a solution to the nominal case equations $$\frac{d}{dt} q(v_0, \lambda_0) + i(v_0, \lambda_0) = u(t) \quad (8)$$

then substituting the perturbation expansion into Eq. (3) and using Eq. (8) to eliminate the nominal-case terms, we obtain the equations for the first-order perturbation expansion $$\frac{d}{dt}\left[\frac{\partial q}{\partial v}\Delta v\right] + \frac{\partial i}{\partial v}\Delta v = -\left[\frac{d}{dt}\left(\frac{\partial q}{\partial \lambda}\right)\right]\Delta\lambda + \frac{\partial i}{\partial \lambda}\Delta\lambda \quad (9)$$

The simplest way to compute waveform sensitivities from Eq. (9) is by solving it once for each parameter (denoted by the subscript k) as $$\frac{\partial v}{\partial \lambda_k}$$

from the equation $$\frac{d}{dt}\left[\frac{\partial q}{\partial v}\frac{\partial v}{\partial \lambda_k}\right] + \frac{\partial i}{\partial v}\frac{\partial v}{\partial \lambda_k} = -\left[\frac{d}{dt}\left(\frac{\partial q}{\partial \lambda_k}\right) + \frac{\partial i}{\partial \lambda_k}\right] \quad (10)$$

where the coefficients are evaluated based on the zeroth order solution $(v_0, \lambda_0)$.

2.2. Delay Computation Via Perturbation

Once the sensitivities in the waveforms are known, the next step is to translate to sensitivity of delay. Delay is computed as $D = T_2 - T_1$ where $T_2$, $T_1$ are the crossing times of the two waveforms of interest. The sensitivity in a crossing time can be related to the sensitivity of the waveform value v(t) at that point via the slew, $\partial v/\partial t$. Suppose there is a small change $\Delta T$ in the crossing time of a given waveform. With a linear model, the corresponding change in the voltage is $$\Delta V = \frac{\partial v}{\partial t} \Delta T \qquad (11)$$

Conversely, if the perturbation in the waveform $\Delta V$ can be computed, the change in crossing time is given by $$\Delta T = \frac{\Delta V}{\frac{\partial v}{\partial t}} \qquad (12)$$

Therefore we can compute the sensitivity of the delay as $$\frac{\partial D}{\partial \lambda} = \frac{\frac{\partial v}{\partial \lambda}\big|_{t_2}}{\frac{\partial v}{\partial t}\big|_{t_2}} - \frac{\frac{\partial v}{\partial \lambda}\big|_{t_1}}{\frac{\partial v}{\partial t}\big|_{t_1}} \qquad (13)$$

Note that for this computation, we only need the waveform sensitivity at a few points in time.

2.3. Statistical Modeling

After the above steps, we have a closed-form, linear model for some vector of observables $X \in R^q$, $$X = K \Delta \lambda. \qquad (14)$$

The vector X could represent waveforms, i.e., the circuit response at several nodes, of it could represent a set of derived quantities such as delays and risetimes. Now we discuss the utilization of these models when the parameters $\lambda$ are stochastic, in particular, Gaussian random variables. For notational convenience we will drop the $\Delta$ notation, and consider $\lambda$ to represent a p-vector of zero-mean Gaussian variables.

The first question is the treatment of correlation structure. Zero-mean Gaussian random variables are fully described by the a correlation matrix $$R_\lambda = E\{\lambda \lambda^T\}, \qquad (15)$$

where E{ } represents the empirical expectation operator [14]. We wish to compute $$R_x = E\{XX^T\}. \qquad (16)$$

Clearly, from the preceding two expressions we have $$R_x = E\{K \lambda K^T \lambda^T\}, \qquad (17)$$

and since K is a linear operator, we have:

$$R_x = K E\{\lambda \lambda^T\} K^T \qquad (18)$$

or $$R_x = K R_\lambda K^T. \qquad (19)$$

This is a standard result. A less familiar presentation uses the Kronecker product identities [15], to relate the vectorization (matrices written as vectors by stacking columns) of the correlation matrices $$vec(R_x) = (K \otimes K) vec(R_\lambda). \qquad (20)$$

In any event, it should be clear that all the information in the correlation of the $\lambda$ is preserved in the final model.

2.4. Statistical Sensitivity Analysis

In Eq. (14) suppose X is a scalar quantity, for example, delay. Then K is a 1×p vector (e.g., a row vector). Suppose a factorization (e.g. eigenvalue or Cholesky) of $R_\lambda$, is available as $$R_\lambda = CC^T. \qquad (21)$$

Let $$l = KC \qquad (22)$$

so that $$R_x = ll^T \qquad (23)$$

$$= \sum_{k=1}^{p} l_k l_k^*. \qquad (24)$$

Since $\lambda$ is zero-mean, we can further write an expression for the variance of X, $\sigma_x^2$, as $$\sigma_x^2 = \sum_{k=1}^{p} |l_k|^2. \qquad (25)$$

We can therefore decompose the variance in the observable X into contributions from each separate parameter. Clearly, the contribution of parameter k to the total variance is $|l_k|^2$. These contributions, which combine the effect of the circuit sensitivity to each parameter, and the magnitude of variation of the parameter, can give insight into which sources of variation are most critical to address to improve performance. This information comes basically "for free" as a by-product of the perturbation analysis.

Additionally, this means of decomposing the contributions of different sources of variation allows an easy means of computing the term $R_a$ in Eq. (1). The contribution of all the independent, non-global random sources for a particular cell are summed into the required variance using a partial sum of Eq. (25).

3. Optimizations for Large Numbers Of Parameters

In this section, we discuss how using adjoint methods can accelerate the computation of the timing models when large numbers of parameters are present. Since the computation time is nearly independent of the number of parameters, the sensitivity to a larger number of parameters can be done simultaneously. Thus, if only a few crossing times are of interest, the computation is very cheap on an information-gained basis. When device mismatch is of interest, the sensitivities to multiple model parameters, for every device in a circuit, are needed, i.e. t∝N. Mismatch could be caused by purely stochastic mechanisms, such as dopant fluctuations in MOSFET channels. Systematic effects such as optical proximity printing errors may also lead to device-by-device parameter variations.

To simplify further analysis, we will utilize the matrix-operator formalism introduced in [16]. The development is quite similar, the major difference being periodic vs. initial boundary conditions. Let us suppose the nominal system given by Eq. (8) has been solved, and an operating point $v_0(t)$ has been computed. For a given timepoint $t_k$, k=1 . . . M, let us introduce the discrete-time capacitance and conductance matrices C, G as follows:

$$C_k \equiv \frac{\partial q}{\partial v}\bigg|_{v(t_k)} \quad (26)$$

$$G_k \equiv \frac{\partial i}{\partial v}\bigg|_{v(t_k)} \quad (27)$$

Similarly, define the "source" functions s as $$s_k^{(q),(l)} \equiv -\frac{d}{dt}\left[\frac{\partial q}{\partial \lambda_l}\right]_{v(t_k)} \quad (28)$$

$$s_k^{(i),(l)} \equiv -\left[\frac{\partial i}{\partial \lambda_l}\right]_{v(t_k)} \quad (29)$$

$$s_k^{(l)} \equiv s_k^{(q),(l)} + s_k^{(i),(l)} \quad (30)$$

and the solution to be found $$v_k = \Delta v|_{(t_k)} \quad (31)$$

We "pack" the time-varying quantities into matrices and vectors with a block structure. If there are N equations in Eq. (9) and M timepoints, then the vectors $$v = \begin{bmatrix} v_1 \\ v_2 \\ \ldots \\ v_M \end{bmatrix} \quad (32)$$

$$s(l) = \begin{bmatrix} s_1^{(l)} \\ s_2^{(l)} \\ \ldots \\ s_M^{(l)} \end{bmatrix}$$

have M sections, each section a vector of N entries. The vector v represents the waveforms of perturbations due to parameter fluctuation. The vectors $s^{(l)}$ will be used to form the p columns (one for each parameter) of the matrix S, $$S = [s^{(1)} s^{(2)} \ldots s^{(p)}] \quad (33)$$

Likewise the matrix $$G = \begin{bmatrix} G_1 & & & \\ & G_2 & & \\ & & \ddots & \\ & & & G_M \end{bmatrix} \quad (34)$$

has M×M blocks, each block an N×N matrix.

After time-discretization, a composite capacitance matrix C may also be formed. The precise structure of this matrix depends on the discretization scheme used. For example, for a backward Euler discretization with timesteps $h_1, \ldots, h_M$, the matrix C becomes $$C = \begin{bmatrix} \frac{C_1}{h_1} & & & \\ \frac{C_1}{-h_2} & \frac{C_2}{h_2} & & \\ & & \ddots & \\ & & -\frac{C_{(M-1)}}{h_M} & \frac{C_M}{h_M} \end{bmatrix} \quad (35)$$

Note that we have omitted uncertainty in the initial condition, which will contribute an additional term to $s^{(q)(l)}$ above. Eq. (9) can be written as one composite matrix equation $$Cv + Gv = S\Delta\lambda \quad (36)$$

We can solve for the waveforms v in closed-form as $$v = (C+G)^{-1} S\Delta\lambda \quad (37)$$

Note that (C+G) is block-lower-triangular. This means that operations with $(C+G)^{-1}$ are relatively cheap to compute. Of course, the matrices C, G are never written down explicitly, we only perform implicit operations as multiplying $(C+G)^{-1}$ times a vector.

The most basic computation is to extract a model for the waveforms as a (linear) function of the individual parameters. This is easily done from Eq. (36). To extract the sensitivity of the waveforms to the parameter $\lambda_k$, we simply solve $$(C+G)v_k = Se_k \quad (38)$$

where $e_k$ denotes the kth unit vector (zero in all entries except entry k, where it is unity). Clearly, to extract the full set of sensitivity information, we must perform p solves—one for each parameter. This is acceptable if p is small, but problematic if p is large. On the other hand, for one solve, we obtain the sensitivities of the waveforms at all nodes and all all timepoints. The computational complexity is O(pM+pNM).

In the time domain, the idea of adjoint analysis is to obtain the sensitivity of a voltage waveform at a single timepoint and single node, to perturbations of all parameters simultaneously, at all timepoints. Suppose the sensitivity of the waveform at a timepoint j, at a node k, is to be computed. In the first step, we construct the (block-structured) vector $$E = \begin{bmatrix} E_1 \\ E_2 \\ \ldots \\ E_M \end{bmatrix} \quad (39)$$

with the vectors $E_l$ given by $$E_l = e_k, l = j; E_l = 0, l \neq j \quad (40)$$

Then we solve $$(C+G)^T v = E \quad (41)$$

for the vector of scaled sensitivities. The vector of waveform sensitivities is then computed from $$\eta = v^T s \quad (42)$$

If the sensitivities for multiple timepoints or nodes are to be computed, there is one solve of Eq. (41) for each such "tap."

The computation of S is done once, and shared across all taps. If t is the number of such taps, the computational complexity is $O(_pM+tNM)$. Compared to the direct computation, savings is possible if t<p.

4. Computational Results

Embodiments of the methods described above have been implemented in an industrial circuit simulator. In this section we describe computational results produced using this implementation.

4.1. Accuracy of Cell Models

Figure 2:
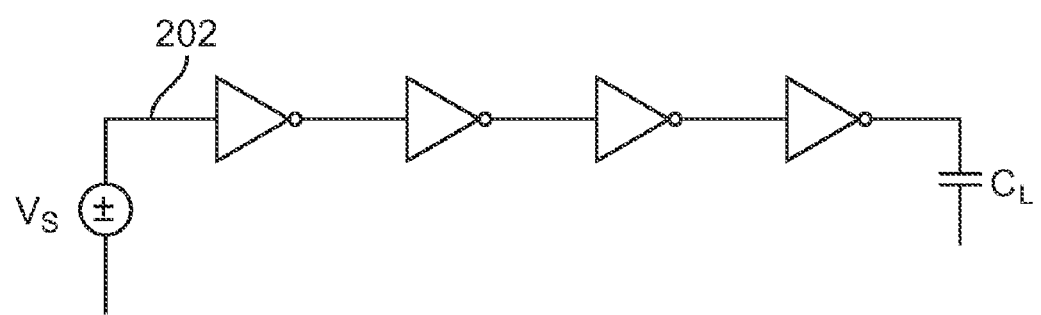
FIG. 2 shows exemplary chain of four inverters.

First we demonstrate that the proposed methodology can accurately capture the parametric behavior of typical digital circuits over a useful parameter range. As an example of a non-trivial circuit, we consider a chain of four inverters. FIG. 1 shows a single inverter in a general schematic 102 and as a two-transistor design 104 including a voltage source $V_s$. FIG. 2 shows a chain 202 of four inverters including a voltage source $V_s$, and a capacitor $C_L$.

We used BSIM4 models in a mock-up 45 nm process. For model parameters, we consider threshold $\Delta V_{T0}$ and channel length $\Delta L$. Using the technique described herein (e.g., Eq. (9)), with a single simulation run we extracted an affine model for the delay as a function of $\Delta V_{T0}$ and $\Delta L$ on each of the transistors, eight transistors in all, for a total of sixteen parameters. These results are shown FIGS. 3 and 4 for variations in delay as functions of $\Delta V_{T0}$ and $\Delta L$ respectively. For purposes of producing FIG. 3, all the transistor channel lengths were varied in the same direction simultaneously. For purposes of producing FIG. 4, all the n-type transistor thresholds, and all the p-type transistor thresholds, were varied in the same direction, but n- and p-type in opposite directions.

Figure 3:
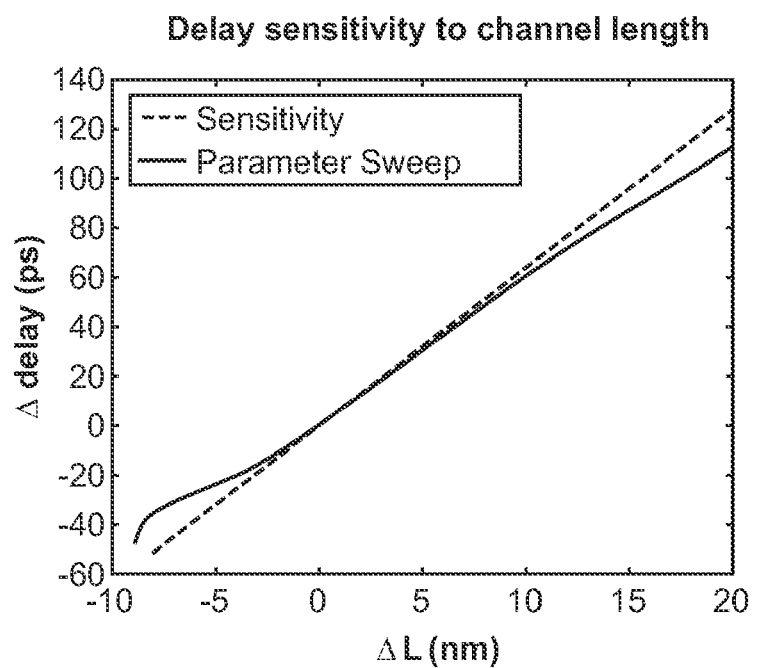
FIG. 3 shows delay sensitivity with respect to a length parameter for an embodiment of the present invention.
Figure 4:
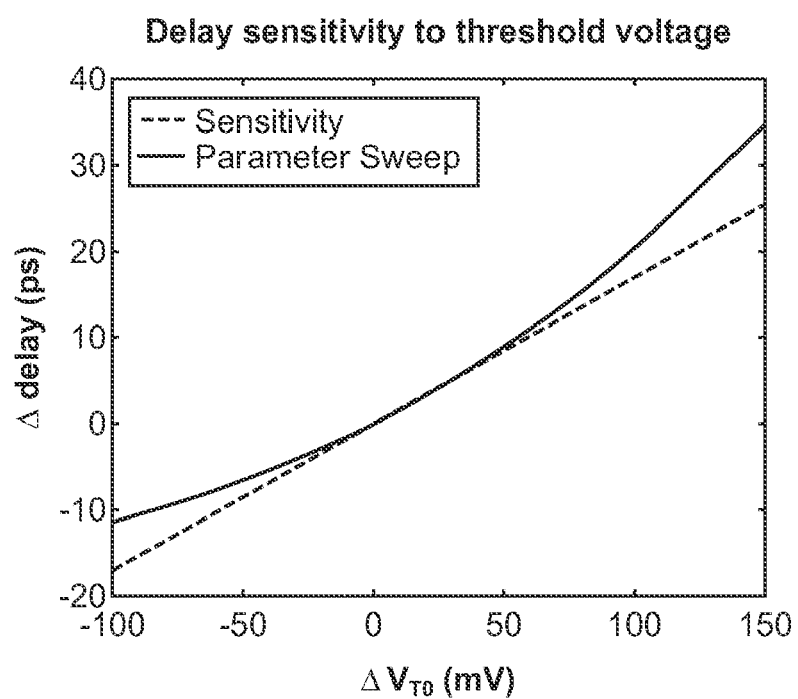
FIG. 4 shows delay sensitivity with respect to a voltage parameter for an embodiment of the present invention.

In each case, we compare to a sequence of 100 full nonlinear high-accuracy transient simulations, each simulation with a different value of the parameter setting. The results, denoted as "parameter sweep" in the FIGS. 3 and 4, show that the analysis accurately captures the tangent line, indicating a correct linear model. For both cases considered here, the linear model turns out to be a fairly good match over a practically relevant parameter range.

4.2. Computational Efficiency

Figure 5:
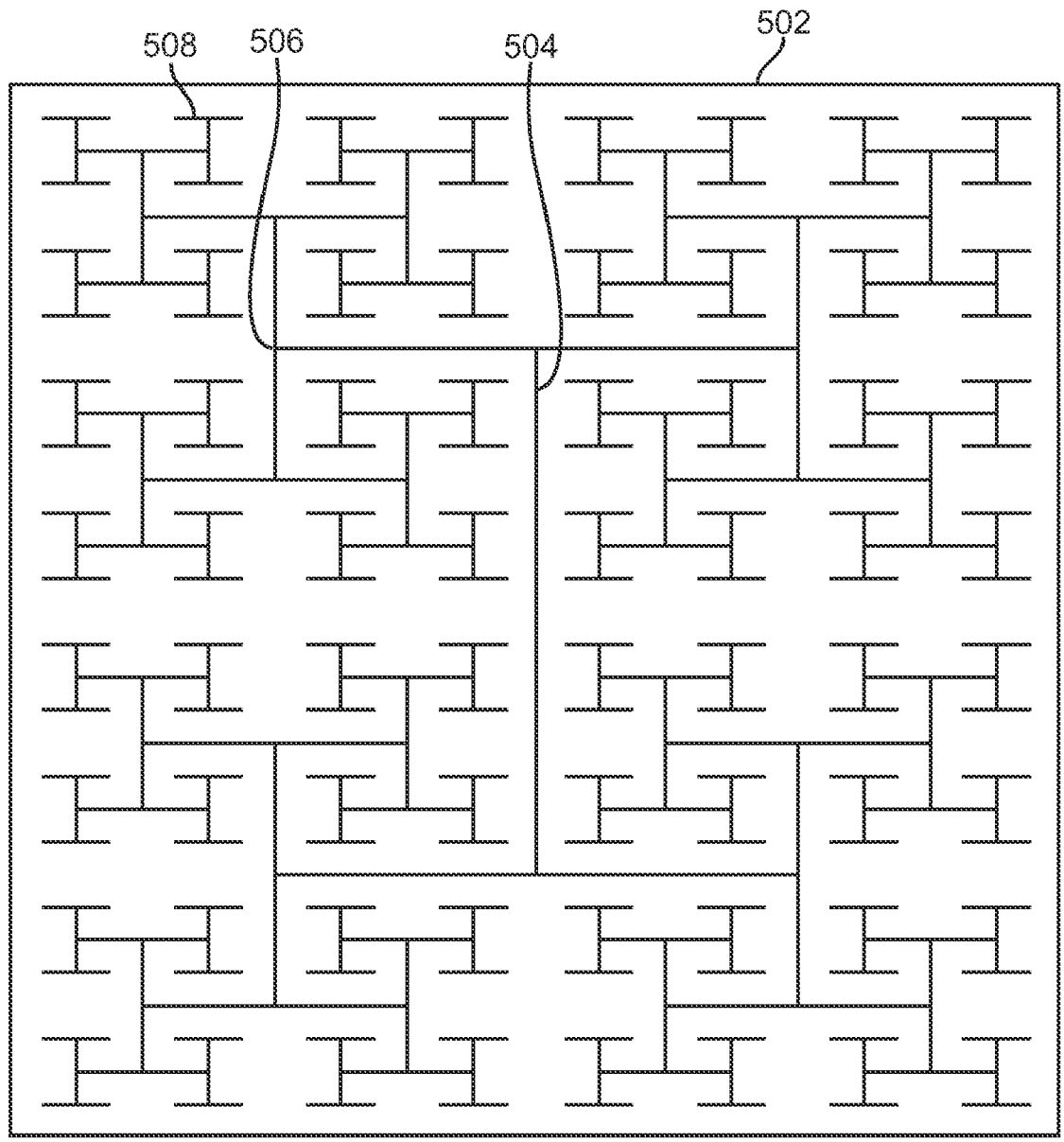
FIG. 5 shows and exemplary circuit with a tree topology network.

To illustrate the potential computational gains of the proposed method, we consider analysis of a moderately size section of (buffered) interconnect intended to represent a section of a clock network. FIG. 5 shows a circuit 502 with a tree network topology. The circuit 502 includes a driver (inverter) in the center 504, a buffer (inverter) at every branch point in the tree 506, and a capacitive load at every end point ("leaf") of the tree 508. As in the inverter chain model 202 described above, it is assumed that every transistor has a variable parameter—threshold voltage and channel length.

This circuit 502 has approximately 350 MOS devices, represented with BSIM4 models, plus about a thousand passive elements (resistors, capacitors) to represent the interconnect. The network has a single driver and 128 signal sinks. We varied the number of parameters in the network, from one (i.e., a single device or device instance parameter is varied) to 676 (i.e., all MOS device channel lengths and threshold voltages are parameters). For comparison, we also show the simulation time used by varying the parameters, performing repeated simulations, and then fitting a model where three points are used fit the sensitivity coefficients.

The results in FIG. 6 are typical of the performance of this type of analysis. With only two parameters varied, and a single delay measurement point, the analytic method (corresponding to certain embodiments of the present invention) shows a modest advantage in performance of 2.4×. This situation is also representative of small paths or of cells with small parameter counts. In cases like this, the primary benefit is robustness.

At the other extreme, with a very large number of parameters, the analytic method outperforms by over two orders of magnitude. This is partially due to efficiencies in implementation possible when performing analytic sensitivity computations, and a great deal due to the advantages of adjoint analysis. As we expect, however, the advantage to adjoint analysis starts to diminish when the sensitivity must be computed at a very large number of distinct circuits nodes and/or timepoints.

It is interesting to note that the most complex version of the model has about 86,000 parameters—676 parameters for each of 128 measurement points! Despite the complexity of the model, the sensitivity solutions were obtained with only an order of magnitude more effort than the single, nominal-case transient simulation. By comparison, parameter-sweep methods are typically computationally intensive because a new solution must be computed for each set of parameter values.

5. Simulator Designs

5.1. Simulation Overview

From a general perspective, a simulator is a computer software program used to analyze a system based upon a description of the system. Basically, a simulator permits a user to ask questions about the system by performing analyses during simulated operation of the system. A simulator numerically computes a response of a system to simulated stimuli. In general, a simulator applies various stimuli to an executable system model in order to predict how the system will respond. Simulation allows one to understand how complex systems behave before one incurs the time and expense of actually implementing the system. Typically, a system description comprises equations that describe the behavior of the system. The simulator solves these equations in the context simulated conditions represented by the stimuli in order to simulate operation of the system under those conditions.

A circuit simulator typically constructs circuit equations from mathematical device models of the components contained in the circuit. [17] The models may be built-in, as is generally the case for semiconductor models developed for SPICE (Simulation Program with Integrated Circuit Emphasis), or they may be specified by the user using some type of modeling language such as Verilog-AMS (i.e., with analog and mixed-signal extensions), which is one of many different hardware description languages (HDLs). A circuit simulator typically constructs a set of ordinary differential equations to describe a circuit to be simulated. The equations are constructed from parameterized device models of circuit components along with circuit connectivity information provided in a netlist. Given an initial condition and a stimulus, the equations are solved for the response of the circuit. More specifically, to form the equations, the simulator combines mathematical models of individual components with equations that describe how the components are interconnected. The interconnection equations typically are derived from Kirchoff's voltage and current laws. The KCL (Kirchoff Current Law) states that the sum of all currents flowing out of a node at any instant is zero. The KVL (Kirchoff Voltage Law) states that the algebraic sum of all branch voltages around a loop at any instant is zero.

Thus, circuit simulators such as SPICE take a description of a circuit and simulate it so as to predict its real world behavior. The circuit description usually consists of a netlist, which is a list of components with additional information that describes how the components should be connected to each other. The circuit description also includes values for the parameters for the various circuit components. The circuit description also includes detailed device models for individual circuit components in the form of a collection of equations that relate their interface quantities. Moreover, the circuit description ordinarily includes general rules on how to combine the interface quantities when components are interconnected. In the past, circuit simulators have provided both of these things as built-in capabilities. The component models are generally written in a programming language such as C and compiled into the simulator. Interconnection rules based on Kirchhoff's Laws, for example, are hard-coded into the simulator.

Figure 7:
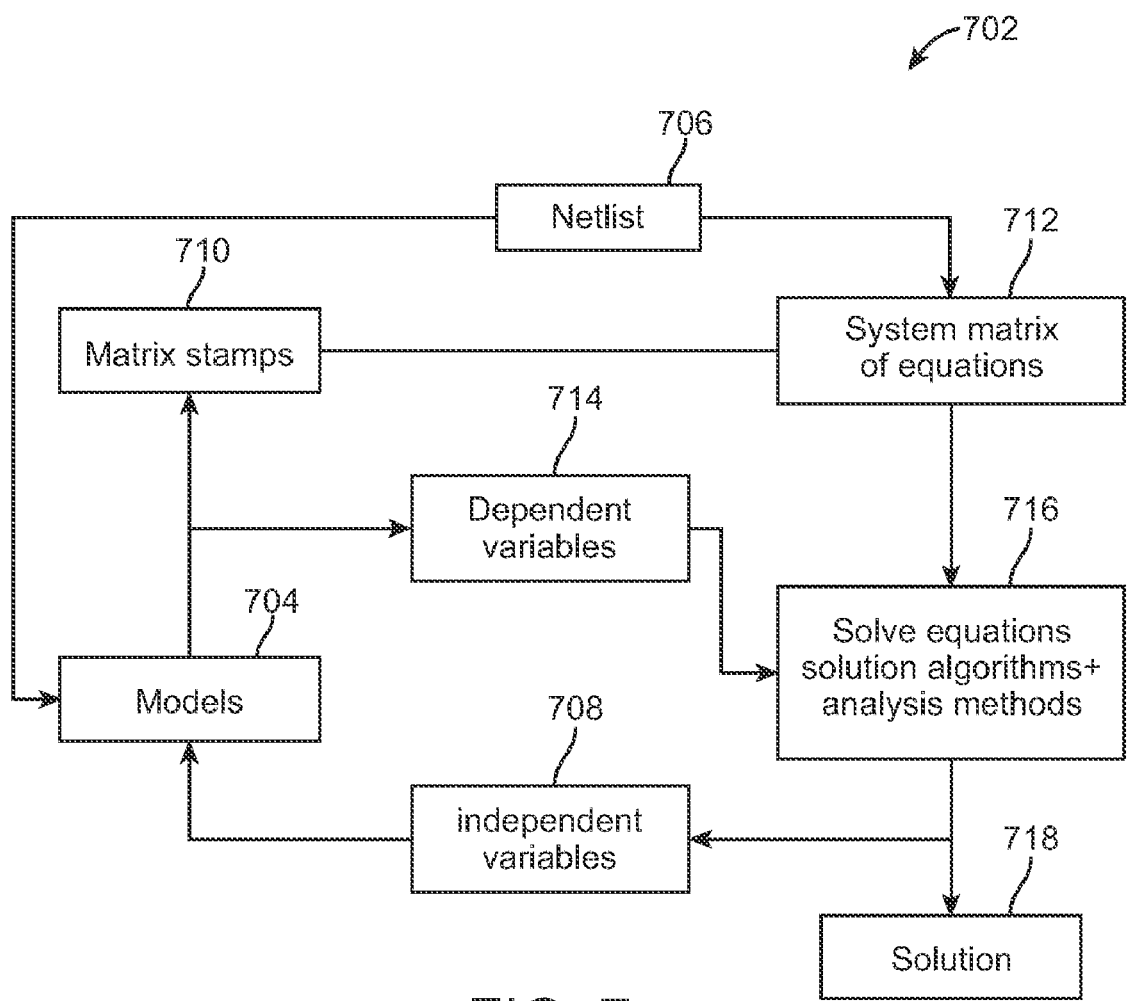
FIG. 7 shows an exemplary simulation flow diagram as applied to certain embodiments of the present invention.

FIG. 7 is an illustrative high-level flow diagram of a typical simulation process 702 that depicts the role of device models 704. A netlist 706 and independent variables 708 can be used can be used to specify the models 704. The models 704 can be used to specify dependent variables (e.g., model outputs) 714 and matrix stamps 710, which can be used with the netlist 706 to specify a system of matrix equations 712. The dependent variables 714 and the matrix equations 712 can be solved 716 to provide a solution 718 modeling problem. Additionally the solver 716 can be used to reset the independent variables 708 in a feedback loop that updates the models 704.

Typically the device models 702 includes a representation of devices or a group of interconnected devices through mathematical equations, circuit representations (i.e., macromodels) or tables. Often these equations are defined piecewise according to different regions of operation observed in the device. A device model may be used to represent active or passive electrical devices. A semiconductor device model, for example, such as that of a MOSFET may involve many complex equations. Although the examples set forth herein relate to circuit simulation using circuit device models, the principles are applicable to other systems such as involving micro-electro-mechanical (MEMS) devices, or partial differential equations describing thermal diffusion, electromagnetic wave propagation, or semiconductor device fabrication.

The simulator formulates a system of equations representing behavior of the system in terms of both device model interconnectivity and device model equations. Device model interconnectivity in the system of equations defines what device models contribute current to which nodes and thus typically leads to a matrix statement of a conservation law such as Kirchoff's Current Law (KCL). A device model's equations may be represented in the system in terms of a device model matrix stamp, which is a pattern of Jacobian matrix entries contributed by the device model. A Jacobian matrix is a matrix of first-order partial derivatives of a vector-valued function. It represents a linear approximation to a differentiable function near a given point. The matrix stamps of the device models of the system of equations indicate the specific contributions each model makes to various rows and columns of the Jacobian matrix.

Once formulation of the system of equations is complete, the simulation process ordinarily proceeds to a numerical based solution based upon user-specified-analysis. There are numerous categories of analysis, such as DC, AC, noise and transient. Also, there are different ways of forming the numerical discretization, such as spectral/harmonic balance versus finite difference based time discretizations, and various numerical techniques for solving the underlying equations, such as different variants of the Newton-Raphson (NR) iteration that may use alternatively direct or iterative matrix solvers.

The NR algorithm, for example, involves an iterative technique that is widely used in many disciplines for defining solutions to nonlinear equations. The NR technique starts with a guess regarding a solution for an independent variable, and keeps refining the guess until it finds (i.e., converges upon) a solution. Every iteration of the NR algorithm involves solving a linear matrix equation with a Jacobian matrix. The independent variables are the variables being solved for by the simulation process. Guessed-at independent variable values are provided to the device models as known values for iteration. The device models are evaluated using the guessed-at independent variable values. The device models provide dependent variable values, which are used to determine whether the guessed-at independent variable values were accurate. If not, a next iteration uses different guessed-at independent variable values.

5.2. Circuit Models for Simulation

Figure 8:
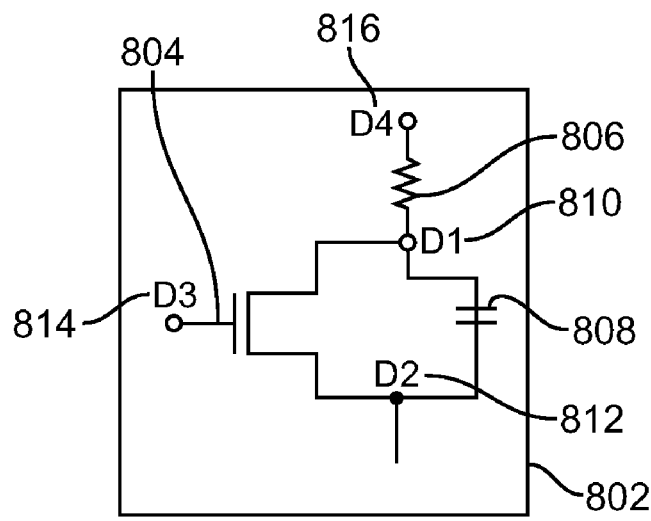
FIG. 8 shows an exemplary circuit schematic as applied to certain embodiments of the present invention.

The sections below describe a system and method to use simulation techniques to assess the impact of parametric variations upon the operation of a circuit. FIG. 8 is an illustrative drawing of a circuit schematic 802 that represents an example circuit that can be simulated in accordance with some embodiments of the invention. The schematic 802 includes a FET (transistor) 804, resistor 806 and capacitor 808. Four nodes 810, 812, 814, 816 are also shown where characteristic measurements may be taken.

Figure 9:
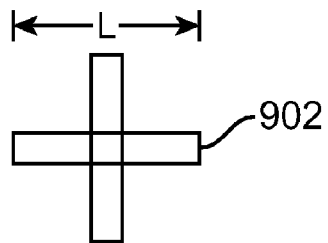
FIG. 9 shows an exemplary transistor model as applied to certain embodiments of the present invention.

FIG. 9 is an illustrative drawing of an example transistor model 902 that provides geometric parameter information for the transistor component 804 of the schematic 802 of FIG. 8. In the example transistor model 902, the transistor's geometric parameter information comprises channel length (L). The transistor model 902 maps physical transistor geometry into parameters annotated on the schematic. For instance, the transistor model 902 may map physical transistor geometry in view of local environment into an effective channel length parameter $L_{eff}$.

Figure 10:
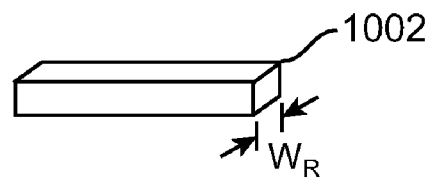
FIG. 10 shows an exemplary resistor model as applied to certain embodiments of the present invention.

FIG. 10 is an illustrative drawing of an example resistor model 1002 that provides parameter information for the resistor component 806 of the example schematic 802 of FIG. 8. In the example resistor model 1002, the resistor parameter information includes a resistor width ($W_R$). The resistor model 1002 maps physical resistor geometry in view of local environment into parameters annotated on the schematic.

Figure 11:
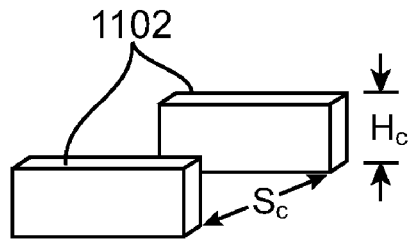
FIG. 11 shows an exemplary capacitor model as applied to certain embodiments of the present invention.

FIG. 11 is an illustrative drawing of an example capacitor model 1102 that provides parameter information for the capacitor component 808 of the example schematic 802 of FIG. 8. In the example capacitor model 1102, the capacitor parameter information includes a capacitor height ($H_C$) and capacitor spacing ($S_C$). The capacitor model 1102 maps physical capacitor geometry in view of local environment into parameters annotated on the schematic.

It will be appreciated that although the example circuit represented by the above-described schematic 802 is associated with several types of illustrative parameters, the principles of the invention are applicable to other types of parameters. A parameter may be a physical geometry parameter that can be measured (e.g., L, $W_R$, $H_C$, $S_C$) or a derived parameter that is computed based upon model equations (e.g., $V_T$). Moreover, a parameter may be set by a designer rather than being either measured or derived. As is well-known to those skilled in the art, these parametric models correspond to functional characteristics of the circuit 802 (e.g., current (I) versus voltage (V) curves).

5.3. System and Method to Simulate Perturbation of Device Model Parameters

Figure 12:
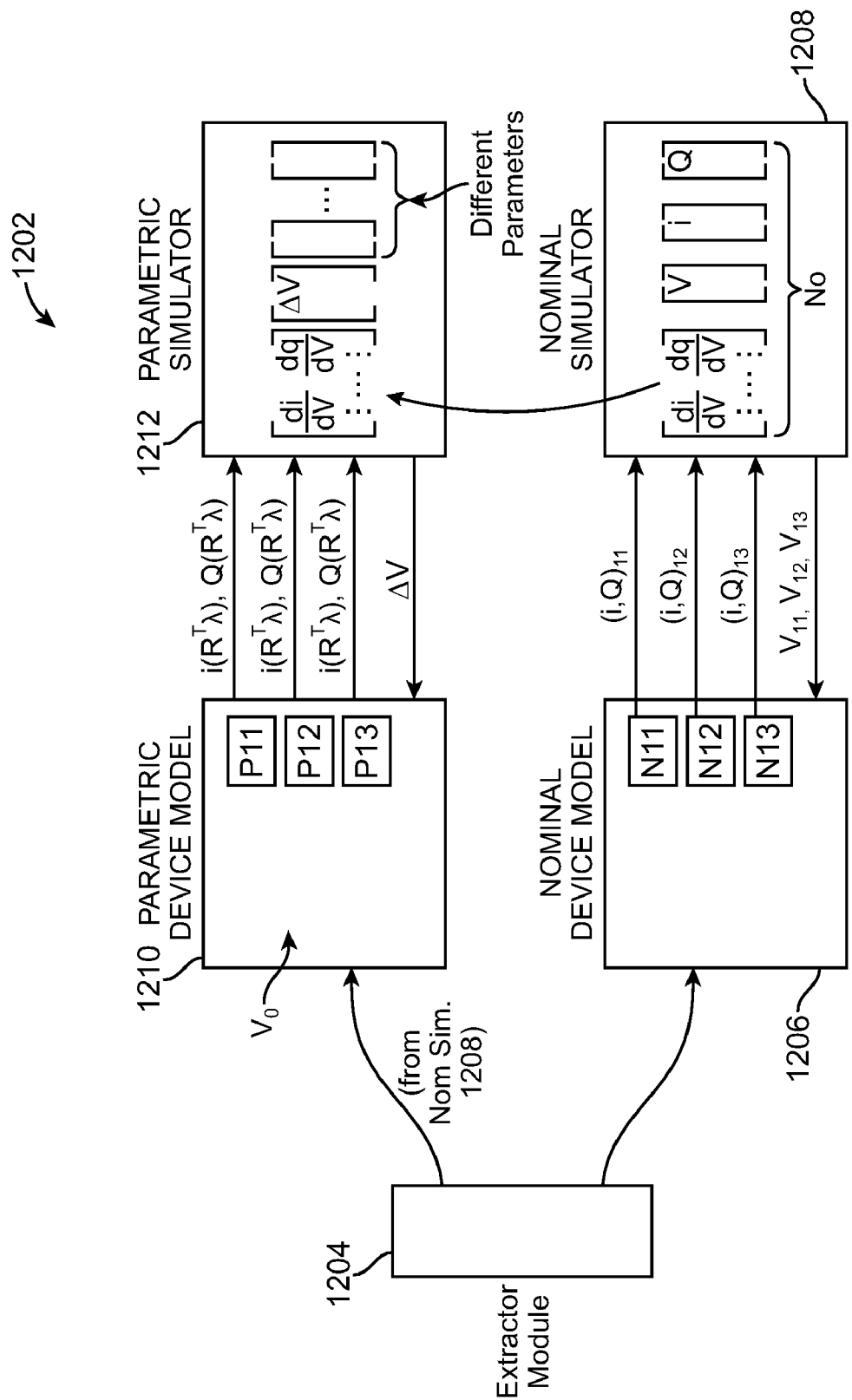
FIG. 12 shows an exemplary block diagram model of a simulation system for an embodiment of the present invention.

FIG. 12 is an illustrative block diagram of a system 1202 in accordance with some embodiments of the present invention.

The system includes an extractor module 1204 to extract connectivity and parameter information concerning the example circuit of the schematic 802 of FIG. 8. A nominal device modeling module 1206 implements behavior of nominal device models, and a nominal simulator module 1208 performs a nominal simulation of a circuit. A parametric device modeling module 1210 implements behavior of nominal device models 1206, and a parametric simulator module 1212 performs a parameterized simulation of the parameterized device model 1210. As discussed below, FIG. 12 shows further details for the elements of the nominal device modeling module 1206 including models N11, N12, and N12 and their connections to matrix elements of the nominal simulator module 1208. Similarly FIG. 12 shows further details for the elements of the parametric device modeling module 1210 including models P11, P12, and P12 and their connections to matrix elements of the parametric simulator module 1212.

The extractor module 1204 functions as an interface between the schematic 802 and device modeling modules 1206, 1208. The extractor 1204 is operative to convert schematically represented components to parameter values in the case of nominal simulation, and to parametric information in the case of parametric simulation (described in section below). The extractor 1204, for example, may obtain parameter information (e.g. functional expressions or ranges of values) from a model library (not shown) that contains models of components represented in the schematic 802. The extractor 1204 passes that converted component-related information, together with component connectivity information, to a nominal device modeling module 1206 for nominal simulation or to a parametric device modeling module 1208 for parametric simulation. Simulation results and circuit characteristics may be represented, for example, by conventional I-V (current-voltage) curves or Q-V (charge-voltage) curves, where these curves are parameterized by model parameters for the parameter device models 1208 (e.g., parameterized by different threshold voltages Vt).

In particular, the extractor module 1204 ascertains the components and connectivity among components of the example circuit represented by the schematic 802. The extractor module 1204 also obtains parameters associated with components of the example circuit schematic 802. As to connectivity, for the example circuit the extractor module 1204 ascertains that a drain terminal of the transistor, a first terminal of the resistor and a first terminal of the capacitor are coupled to a first node 810. A source terminal of the transistor and a second terminal of the capacitor are coupled to a second node 812. A gate terminal of the transistor is coupled to a third node 814. A second terminal of the resistor is coupled to a fourth node 816. As to parameters for the example circuit, the extractor module 1204 uses transistor models (e.g, model 902) to ascertain parameter values for L and $V_T$ associated with the transistor. The extractor module 1204 uses resistor model 1002 to ascertain a parameter value $W_R$ for resistor. The extractor module 1204 uses capacitor model 1102 to ascertain parameter values $H_C$ and $S_C$ for the capacitor.

5.3.1. Nominal Simulation

The nominal simulation module 1208 and nominal device modeling module 1206 operate together to implement a numerical method to simulate nominal operation of the circuit represented by the schematic 802. By nominal operation, it is meant that only one process condition or an invariant set of the parameters applies to the simulation. The nominal simulation module 1208 uses the connectivity information of the simulator device nominal modeling module 1206 to traverse the circuit to identify nodes at which to specify guessed-at values for independent variable v(t) in response to a stimulation waveform u(t) applied to the circuit.

In some embodiments, the nominal simulation module uses the NR algorithm as the numerical method to solve a matrix system given by Eqs. (6), (7) and (8) to iteratively converge upon solution values for v(t) for specified nodes of the circuit for a plurality of time points in response to u(t). For each such time point, the solution to v(t) is represented as a vector of values corresponding to such specified nodes of the circuit. The nominal simulation module 1208 provides guessed-at values for independent variable v(t) to nominal device modeling module 1206, which in response, calls upon nominal device nominal models N11, N12 and N13 to produce corresponding values for dependent variables i(t) and q(t) for terminals of the transistor, resistor and capacitor of the circuit of the schematic 802.

The nominal transistor device model N11 comprises equations that represent operation of the transistor in response to a voltage condition and to values of one or both of parameters L and Vt determined by the extractor 1204. The nominal resistor device model N12 comprises equations that represent operation of the resistor in response to a voltage condition and a resistance value (R) determined by the extractor A4 based upon parameter $W_R$. The nominal capacitor device model N13 comprises equations that represent operation of the capacitor in response to a voltage condition and a capacitor value (C) determined by extractor 1204 based upon one or both of parameters $H_C$ and $S_C$.

More specifically, for example, in operation the nominal transistor device model N11 is used to iteratively produce values for dependent variables $i(t)_{11}$ and $q(t)_{11}$ associated with the transistor in response to a guessed-at value for an independent voltage variable v11 assigned to a terminal of the transistor by nominal simulation module 1208. Similarly, nominal resistor device model N12 is used to iteratively produce values for dependent variables $i(t)_{12}$ and $q(t)_{12}$ associated with the resistor in response to a guessed-at value for an independent voltage variable $v(t)_{12}$ assigned to a terminal of the resistor by nominal simulation module N2. Likewise, nominal capacitor device model N13 is used to iteratively produce values for dependent variables $i(t)_{13}$ and $q(t)_{13}$ associated with the capacitor in response to a guessed-at value for an independent voltage value $v(t)_{13}$ assigned to a terminal of the capacitor by nominal simulation module 1208. The respective dependent variable values i(t) and q(t) iteratively produced by the nominal device models N11, N12 and N13 in response to iterative independent voltage variable values v(t) are communicated back to the simulation module N2 in order to numerically evaluate guessed-at solutions.

The nominal simulation module 1208 implements the NR algorithm to iteratively find a solution for vectors representing independent variable v(t) in response to time-varying stimulation u(t) for each specified node of the circuit for each of multiple time points. For each iteration, the nominal device models N11, N12 and N13 respond by producing dependent variable values i(t) and q(t) for respective transistor, resistor and capacitor connected nodes of the circuit undergoing simulation. During each iteration, the nominal device modeling module 1206 communicates the respective produced dependent variable values i(t) and q(t) to the nominal simulation module 1208. During each iteration, the nominal simulation module uses the respective produced i(t) and q(t) values to evaluate the guessed-at independent voltage variable value v(t) for that iteration.

Through this iterative solution process, the nominal simulation module converges upon solutions to v(t) at each of multiple time points of the stimulation waveform u(t). In the course of the nominal solution process, the nominal simulation module N2 produces Jacobian matrix solutions for each time point. The Jacobian matrix for a given time point of u(t) represents the set of partial differentials $\partial i/\partial v$ and $\partial q/\partial v$ for equations of the form of Eq. (8) for the solution voltage vector v(t) at that time point.

Thus, the nominal simulation module N2 produces a set of solutions for the independent variable voltage v(t) for each of multiple time points of u(t). These solutions comprise a nominal solution to the independent voltage variable v(t). The nominal simulation module 1208 also produces values for Jacobian matrices at each such time point. As explained below, a perturbation analysis is performed relative to the nominal voltage solution for each of multiple time points using corresponding Jacobian matrices developed for such time points during the nominal simulation and also using parametric device models.

5.3.2. Parametric Simulation

The extractor module 1204 provides component connectivity information and component parameter information for the circuit represented by the schematic 802 to the parametric device modeling module 1210 that implements behavior of parameterized device models. A parametric simulator module 1212 performs a parameterized simulation of the device model 1210.

In the past, an extractor module such as extractor module 1204 communicated instance-based information with a nominal device modeling module, such as nominal device modeling module 1206. Instance-based parameter information pertains to a particular instance of a device, and does not encompass variation in device parameter values. For example, for any given parameter of any given device, extractor 1204 computes and passes to the nominal devices model 1206 a specific number that indicates a best estimate of the parameter under nominal design conditions. To give one example, a parameter in a MOS device model may be the drawn device length L. In the nominal device model 1206, L is represented by number (e.g., 43 nm) or an expression convertible directly to a number (for example, 43 nm–2*dL, where dL is given by another numeric parameter).

In accordance with an embodiment of the present invention, the parametric device modeling module 1210 has the capability to receive parametric information in the form of a parametric model that provides a range or set or distribution of parameter values or provides functional rules for variation in the value of a device parameter. In the parametric device modeling module 1210, for example, L is represented by a parametric model that provides a richer description of the possible variation of L. For example, L could be given by a range (e.g., 40 nm to 60 nm), a set of possible values ("corner" points, e.g., 40 nm, 50 nm, 60 nm), a statistical distribution (e.g., Gaussian with mean 50 nm and variance 3 nm), a histogram or a functional expression (e.g., affine function, polynomial, exponential, sums, combinations, and compositions of these), whose variables are not given single numeric values at the time they are passed to the parametric device model 1210 or the parametric simulation module 1212.

Many such model parameters may exist in the communication between the extractor 1204 and the parametric model 1202. Of course, some parameters may be treated in the parametric model 1202 in the nominal device model 1206, in a non-parametric way, depending on the mode of operation. For example, in one mode, MOS L may be analyzed parametrically, and threshold voltage Vt non-parametrically. In this mode, even if Vt may depend on process conditions, e.g., through stress or proximity effects, but the impact of these effects and computed out before passing the model information to the nominal device model 1206 (or the parametric model 1202 in the non-parametric mode). The nominal device model 1206 has knowledge only of a single condition then.

Thus, the extractor module 1204, rather than communicate a nominal parameter value as in the case of nominal simulation described in the prior section above, instead communicates parametric information that expresses ranges of variation (e.g., histogram or corner cases) or rules (e.g., expressions) governing variation in a device parameter value. The parametric device modeling module 1210 uses the parametric information to determine one or more parameter values during simulation. The parametric information can be used to determine different parameter values for use in different simulations of a system so as to explore, for example, the impact of variations in device characteristics upon overall behavior of a system. In essence, the extractor module 1204 passes parametric information to the parametric device modeling module 1210 that enables that module to determine different parameter values that are dependent upon variable device characteristics to be used during different simulations to evaluate the impact of variation of device characteristics upon system behavior.

Parametric simulation module 1212 and parametric device modeling module 1210 operate together to implement a numerical method to simulate parametric operation of the circuit represented by the schematic 802. By parametric operation, it is meant that one or more process conditions or parameters are varied as part of the simulation. More specifically, during parametric simulation an expression or a function or a family of such may be produced for different nodes at different time points. In contrast, during nominal simulation a number value may be produced for different nodes at different time points. The parametric simulation module 1212 uses a numerical technique to solve a matrix system given by Eqs. (9) and (10) to determine changes in voltage $\Delta v$ about a nominal voltage $v_0$ the independent variable in response to changes in parameter values $\lambda$. In the illustrated embodiment, the parametric simulation module 1212 uses the partial differentials $\partial i/\partial v$ and $\partial q/\partial v$ determined in the course of the nominal simulation by the nominal simulation module N2. The parametric simulation module 1212 provides guessed-at values for independent variable $\Delta v$ to the parametric device module 1210, and in response, the parametric device modeling module 1210 produces dependent parametric variable functions $i(v_0, \lambda)$ and $q(v_0, \lambda)$.

It will be appreciated that the $\partial q/\partial v$ and $\partial q/\partial v$ values on the left side of Eq. (9) are determined by the nominal simulation module 1208 in the course of nominal simulation. The $\Delta v$ value on the left side of the Eq. (9) is the independent variable that is guessed-at and solved for by the parametric simulation module 1212. The $\partial q/\partial \lambda$ and $\partial i/\partial \lambda$ values are dependent variables produced by device models P11, P12 and P13 in response to the guessed-at values for $\Delta v$. Eq. (10) provides an efficient approach to compute waveform sensitivities for each parameter. So, k curves are produced for k parameters.

A parametric transistor device model P11 comprises equations that represent small variation in transistor current and voltage for a nominal voltage condition $V_o$, as a function of variation of one or both of parameters L and Vt. A parametric resistor device model P12 comprises equations that represent small variations in resistor current and voltage for a nominal voltage condition $V_o$, as a function of parameter $W_{R+}$. A parametric capacitor device model P13 comprises equations that represent small variations in capacitor current and voltage for a nominal voltage condition $V_o$, for one or both of parameters $H_C$ and $S_C$.

Parameter modules 1210, 1212 cooperate to simulate the behavior of the circuit of the schematic 802 under variations of values of one or more parameters λ about each of a plurality of nominal voltages $V_o$. The parametric simulation module 1212 obtains nominal voltage values $v_0$ for nodes of the circuit. The nominal voltage values are produced as described above, by the nominal simulator modules 1206, 1208 in response to the stimulation waveform u(t). In particular, a different set of nominal voltage values $v_0$ for specified nodes of the circuit is produced by the nominal simulator modules 1206, 1208 for each time increment of the stimulation waveform u(t). The simulator device model parametric module 1210 calls upon device parametric models P11, P12 and P13 to produce corresponding $i(v_0, \lambda)$ and $q(v_0, \lambda)$ dependent parametric variable functions for nodes of the transistor, resistor and capacitor of the circuit of the schematic 802.

More specifically, in operation the parametric transistor device model P11 is used to produce dependent parametric variable functions $i(v_0, \lambda)_{11}$ and $q(v_0, \lambda)_{11}$ associated with a node of the transistor for voltage variations $\Delta v_{11}$ about a nominal voltage value $v_{011}$ assigned to the transistor node. Similarly, parametric resistor device model P12 is used to produce dependent parametric variable functions $i(v_0, \lambda)_{12}$ and $q(v_0, \lambda)_{12}$ associated with a node of the resistor for voltage variations $\Delta v12$ about a nominal voltage value $v_0 12$ assigned to the resistor node. Likewise, parametric capacitor device model P13 is used to produce dependent parametric variable functions $i(v_0, \lambda)_{13}$ and $q(v_0, \lambda)_{13}$ associated with a node of the capacitor for voltage variations $\Delta v13$ about a nominal voltage value $v_0 13$ assigned to a capacitor node. The respective $i(v, \lambda)$ and $q(v, \lambda)$ parametric functions produced by device parametric models P11, P12 and P13 are provided back to the simulation module 1212 for use in the perturbation simulation of the circuit represented by the schematic 802 with parametric variations.

Thus, for each selected time point of u(t), the solution to $i(v_0, \lambda)$ and $q(v_0, \lambda)$ is represented as a vector of dependent parametric variable functions corresponding to such specified nodes of the circuit. As the parametric simulation module 1212 attempts to iteratively converge upon a solution for independent variables Δv, it calls upon parametric device module 1210 to iteratively call upon parametric device models P11, P12 and P13 to produce corresponding $i(v_0, \lambda)$ and $q(v_0, \lambda)$ dependent parametric variable functions for nodes of the transistor, resistor and capacitor of the circuit of the schematic 802 or any location in the overall circuit where there is a desire to observe an output.

The above computation is performed for each of multiple parameters. The multiple resulting output waveforms separately represent variation of the output waveform with variation of each of multiple parameters.

It will be appreciated that the numerical process employed by the nominal and parametric simulation modules 1208, 1212 employ conservation relations to arrive at solutions for the independent variable on a node-by-node basis. The rules given by KVL and KCL are examples of nodal conservation relations in the circuit context. For instance, the NR algorithm may use nodal analysis (NA), such as KCL, to evaluate the correctness of guessed-at voltage values at specified nodes of a circuit undergoing simulation. Alternatively, the simulation modules 1208, 1212 may use modified nodal analysis (MNA), such as KCL plus extra equations for voltage sources, inductors, etc. As yet another alternative, the simulation modules 1208, 1212 may use Sparse Tableau, which involves circuit constitutive relations (I-V), current conservation law plus voltage loop law. However, it will be appreciated that the invention is not limited circuit based systems and is not limited to nodal analysis. For example, the principles of the invention also are applicable to micro-electro-mechanical (MEMS) devices, partial differential equations describing thermal diffusion, electromagnetic wave propagation, or semiconductor device fabrication.

6. Additional Performance Metrics

Although the focus above has been directed to timing analysis where delay is used as a performance metric, embodiments of the present invention are also directed to other performance metrics where sensitivities can be calculated by means of LTV perturbation theory (e.g., as in Eqs. (3)-(10)). For example, after voltage or waveform sensitivities have been calculated (e.g., as in Eq. (10)), sensitivities of related performance metrics can also be calculated (e.g., based on voltage values at characteristic nodes and characteristic times).

For example, depending on the details of the operational setting the performance metric can be chosen from power, energy, "slew" (e.g, maximal rate of signal change in the circuit), distortion, intermodulation products (e.g., IP2, IP3), noise SNR (signal-to-noise ratio), glitch amplitude, and gain as well as delay. For each choice of a performance metric, a corresponding performance sampling vector E can be specified as a generalization of Eqs. (39)-(40) to measure the performance value by sampling state values (e.g., voltages). For example, in the case of energy (power dissipated over a finite time by the circuit), the energy may be computed from the I-V product at the power supplies. Assuming a supply voltage independent of the parameter, the necessary performance sampling vector is easily computed from the energy expression as $$e = \sum_k i_k v_k \tag{43}$$

$$\frac{\partial e}{\partial \lambda} = \frac{\partial}{\partial \lambda} \sum_k i_k v_k \tag{44}$$

$$= \sum_k \frac{\partial i_k}{\partial \lambda} v_k$$

so that the performance sampling vector E in Eq. (40), which will sample supply current sensitivities, has an entry at the position corresponding to the supply current state variable with amplitude equal to the (possibly time-varying) supply voltage.

7. Exemplary Methods

Figure 13:
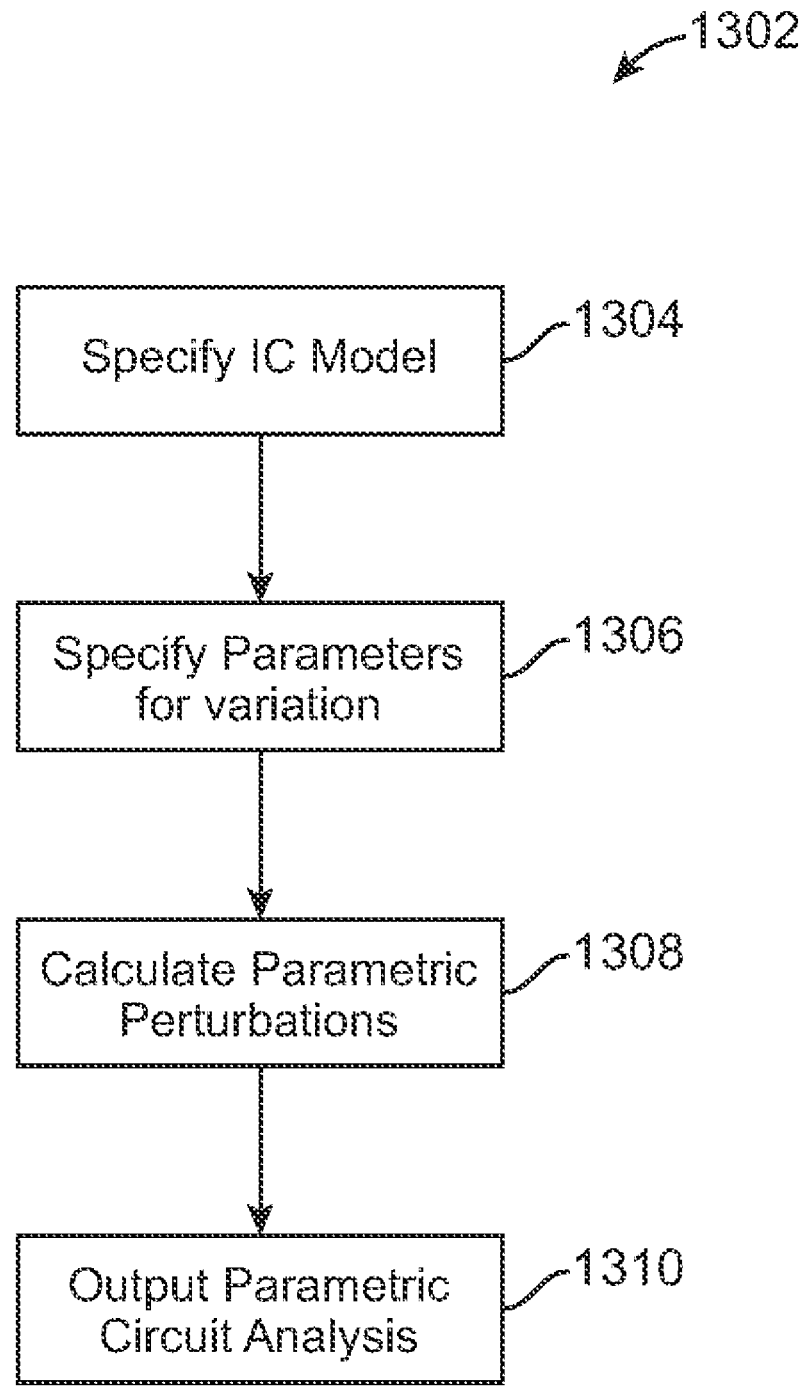
FIG. 13 shows an exemplary method of simulating parametric variations according to an embodiment of the present invention.

The above-described methods and systems can be employed in a variety of ways depending the on the requirements of the operational setting. FIG. 13 shows an exemplary method 1302 for simulating parametric variations in an integrated circuit according to an embodiment of the present invention. As an example for constructing a parametric model for a measured quantity, we consider delay in the presence of threshold voltage mismatch. In this case we may be interested in constructing curves that represent delay (e.g., Eq. (13)) as a function of the threshold voltage.

First a circuit designer (or more generally a user of the method) specifies an IC (Integrated Circuit) model 1304. This may include a circuit schematic and a netlist, for example. Additionally, the designer specifies parameters for variation 1306. This can be done, for example, as a side file, or by annotations in the circuit netlist. The system may obtain this information automatically from a circuit layout (e.g., the range for the spacing parameter $S_c$ in FIG. 11). However, no additional circuit elements need to be added explicitly by the designer at this stage. Next parametric perturbations are calculated 1308. And finally the results of the parametric circuit analysis can be output to a user (e.g., displayed at a terminal or saved to a computer-readable medium for subsequent analysis). For example, one can display plots of delay vs. parameter value as in FIG. 3 or 4 as well as additional curves representing the distributions of delays. Details for the calculating the parametric perturbations 1308 may vary according to the requirements of the operational setting, especially as to whether linear or nonlinear models are used.

Figure 14:
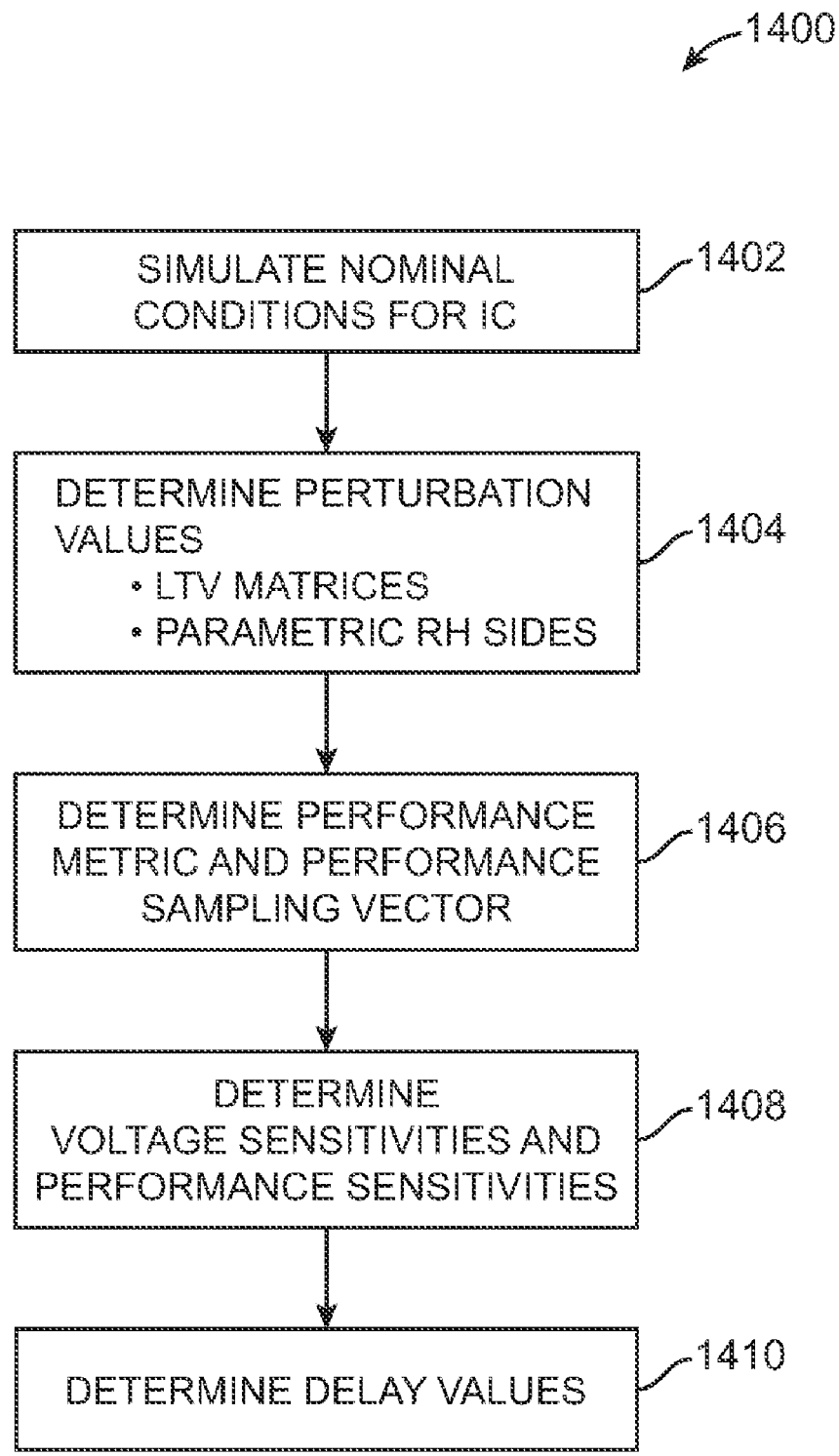
FIG. 14 shows an exemplary method for calculating parametric perturbations for the embodiment shown in FIG. 13.

For the exemplary case of calculating the effect of parametric perturbations on delays, FIG. 14 shows an exemplary method 1400 for calculating the parametric perturbations 1308. First the user simulates nominal conditions for the IC 1402. Next the user determines perturbation values for the system 1404. Next the user determines a performance metric (e.g., delay) and a performance sampling vector (e.g., to estimate values for the performance metric) 1406. Next the user determines voltage sensitivities and performance sensitivities 1408. And finally one or more performance values can be determined 1410.

Further details for the method 1400 are now discussed for the case where the system equations are linear. That is, we consider the case where a linearized model (e.g., Eqs., (6)-(7)) can be used to model the effect of parametric perturbations on the state variables. First the designer simulates the nominal condition or state, for example, by a discrete approximation to $v_0$ in Eq. (3) where the parameter $\lambda_0$ has been set to a nominal or center-point value 1402. Next the LTV matrices dq/dv, di/dv are calculated (e.g, as in Eqs. (6) and (7)) 1404. Next the parametric right-hand sides are calculated 1404. For example, For each operating point, for each transistor, for each process variable, evaluate the individual device I,Q functions as to obtain an affine model for I,Q, on each devices, as a function of the device parameters. This function can be performed, for example, by parametric device modeling module 1210 in FIG. 12. There are several ways to perform this function. For example, the individual devices can be evaluated at some process points and a linear curve fit. Note that, in general, this cannot be done from the schematic level in an efficient way. It also cannot be done in the nominal device modeling module 1206. Additionally parameter information (e.g., range information) can be propagated (e.g, from an extractor model 1204).

Next the adjoint perturbation matrices are constructed from the LTV matrices 1404. This includes, for example, G and C as in Eqs. (34) and (35). Typically, these matrices are not written explicitly, but represented in a block-sparse form [4]. Next, one can determine (e.g., specify) the performance metric and the performance sampling vector. In the case where delay is the performance metric, then from the nominal delay calculation, the crossing point is identified (e.g., as in Eq. (11)) 1406 and the adjoint RHS (right-hand side) vector is calculated (e.g., as in Eq. (39)). Next the voltage sensitivities are calculated at the crossing point by solving the adjoint equation (e.g., as in Eq. (41)) 1408. Next the performance sensitivities are calculated from the parametric RHS vector (e.g, as in Eq. (42)) 1408. In some operational settings the performance sensitivities will be sufficient for analysis of the IC since the effect of parameter variations on performance can be quantified (e.g., as in variance calculations given by Eq. (25)). Additionally, one or more performance values can be calculated from the delay sensitivities by constructing and evaluating the affine model for performance as a function of parameters (e.g., as in Eq. (1)) 1410.

This embodiment 1400 can be extended to cover applications to nonlinear models. Here we concentrate only on the parametric part of the analysis. The above-described linear methods were directed towards models of the form given by Eq. (3), with linear approximations given by Eqs. (6), (7).

In a second-order approximation for a nonlinear model, we can write an approximation $$i(v, \lambda) = i(v_0, \lambda_0) + \frac{\partial i}{\partial \lambda}\Delta\lambda + \frac{\partial i}{\partial v}\Delta v + \sum_k L_k(r_k^T \Delta v) \otimes (r_k^T \Delta v) + \qquad (45)$$
$$\sum_k M_k(r_k^T \Delta v) \otimes (t_k^T \Delta \lambda) + \sum_k N_k(t_k^T \Delta\lambda) \otimes (t_k^T \Delta\lambda)$$

This approximation replaces the linear model given by Eq. (7) (and equivalently Eq. (6)) with a nonlinear model for the effect of parametric perturbations on the state variables. Here, the index k runs over all the devices. The vectors r, t act as selection vectors (projections) from the global vectors of node voltage v and parameters $\lambda$. A similar expression holds for q; for simplicity we will describe the nonlinear-I case only. Similarly to standard techniques [16], we can re-pose the problem of finding a second order response model as two separate equations. For convenience we define $$G(t) = \left.\frac{\partial i}{\partial v}\right|_{v0(t)} \qquad (46)$$

$$C(t) = \left.\frac{\partial q}{\partial v}\right|_{v0(t)} \qquad (47)$$

Next we decompose the response into two terms, first order response and second order response, as $$\Delta v = x_1(t) + x_2(t) \qquad (48)$$

The resulting equation sets are $$\frac{d}{dt}C(t)x_1(t) + G(t)x_1(t) = \sum_k s_k(t)(t_k^T \Delta\lambda) \qquad (49)$$

$$\frac{d}{dt}C(t)x_2(t) + G(t)x_2(t) = \sum_k L_k(r_k^T x_1) \otimes (r_k^T x_1) + \qquad (50)$$
$$\sum_k M_k(r_k^T x_1) \otimes (t_k^T \Delta\lambda) + \sum_k N_k(t_k^T \Delta\lambda) \otimes (t_k^T \Delta\lambda)$$

As contrasted with conventional approaches, this methodology includes a decomposition into device-by-device nonlinearities so that, instead of terms like $x_1(t) \otimes x_1(t)$ or $\Delta\lambda(t) \otimes \Delta\lambda(t)$, we work with quantities projected to each local device.

Further details for the method 1400 are now discussed for the case where the system equations are nonlinear as described above with respect to Eqs. (45)-(50).

First the designer simulates the nominal condition or state, for example, by a discrete approximation to $v_0$ in Eq. (3) where the parameter $\lambda_0$ has been set to a nominal or center-point value 1402. Next the LTV matrices dq/dv, di/dv are calculated (e.g, as in Eqs. (6) and (7)) 1404. Next the parametric right-hand sides are calculated 1404. For example, For each operating point, for each transistor, for each process variable, evaluate the individual device I,Q functions as to obtain an affine model for I,Q, on each devices, as a function of the device parameters. This function can be performed, for example, by parametric device modeling module 1210 in FIG. 12. There are several ways to perform this function as discussed above for the linear case.

Next the adjoint perturbation matrices are constructed from the LTV matrices 1404. This includes, for example, G and C as in Eqs. (34) and (35). Typically, these matrices are not written explicitly, but represented in a block-sparse form [4]. Next the forward sensitivities are calculated from the linearized equations. That is, for each device and parameter pair (l,k), solve:

$$\frac{d}{dt}C(t)x_{1,k}(t) + G(t)x_{1,k}(t) = s_k(t) \qquad (51)$$

Next, one can determine (e.g., specify) the performance metric and the performance sampling vector. In the case where delay is the performance metric, then from the nominal delay calculation, the crossing point is identified (e.g., as in Eq. (11)) 1406 and the adjoint RHS (right-hand side) vector is calculated (e.g., as in Eq. (39)). Next the voltage sensitivities are calculated at the crossing point by solving the adjoint equation (e.g., as in Eq. (41)) 1408. From this one obtains the sensitivity vector v(t). Next perturbations at the crossing points are calculated. That is, one computes the quadratic (second-order) perturbation model for voltage at the crossing points, as $$\Delta V(\Delta \lambda) = v^T \begin{bmatrix} \sum_k L_k (r_k^T x_{1,k} t_k^T \Delta \lambda) \otimes (r_k^T x_{1,k} t_k^T \Delta \lambda) + \\ \sum_k M_k (r_k^T x_{1,k} t_k^T \Delta \lambda) \otimes (t_k^T \Delta \lambda) + \\ \sum_k N_k (t_k^T \Delta \lambda) \otimes (t_k^T \Delta \lambda) \end{bmatrix} \qquad (52)$$

One can interpret Eq. (52) and related calculations in the following way. The perturbation values for the IC model include a first-order system (e.g., as in Eq. (49)) that is driven by source functions that correspond to the parametric perturbations and a second-order system (e.g., as in Eq. (50)) that is driven by a solution of the first-order system. Determining the performance-sensitivity values includes solving the first-order system for a first-order voltage sensitivity (e.g., as in Eqs. (51)), solving an adjoint first-order system for a performance-sampling sensitivity corresponding to the performance-sampling vector (e.g., as in Eq. (41)), and calculating a second-order performance sensitivity by using the second-order system to combine the first-order voltage sensitivity and the performance-sampling sensitivity (e.g., as in Eq. (52)).

Thus, the performance sensitivities can be calculated from the parametric RHS vector construct and output the quadratic model for performance as a function of parameters, via Eq. (13) or quadratic extension thereof 1410. As discussed above with respect to the linear case, the results of the parametric circuit analysis can be output for storage or display 1310. As compared with conventional approaches to parametric analysis, this approach can lead to considerable computational savings. For example, suppose there are N devices, p parameters each. Then the total number of parameters is P=Np, his approach is superior in time complexity to standard ways of building second-order of models by a factor of N/p, which can be hundreds or thousands By contrast, many conventional approaches to parametric circuit analysis involve adding additional sources to model the mismatch effect [18, 19]. That is, for each "mismatch" source, the designer "sweeps" the source value and runs a circuit simulation for each parameter value in the range (e.g., solving an additional set of equations corresponding to Eq. (3)). Then the performance metric for each sweep-value of the parameter can be displayed (e.g., as in FIGS. 3 and 4 for delay as the performance metric). The computational cost associated with the multiple circuit simulations can be considerable as compared with above-described embodiments of the present invention. For example, for each performance metric to be measured, and for each different value of parameter settings, a separate simulation must be run. Thus, if there are M performance metrics and P parameters, the cost is equivalent to M*P separate transient simulations. It is not uncommon to have both M and P on the order of hundreds to thousands. This methodology could be extended to include interactions between the parameters, for example to build nonlinear response surface models, but the cost can be exorbitant. For example, to build a full quadratic model requires M*P*P simulations, which can be tens of thousands of times more costly than a single transient simulation.

At least some values based on the results of the above described methods can be saved for subsequent use. For example the sensitivity values (e.g., FIGS. 3 and 4) can be saved directly for application as in statistical timing analysis. Alternatively, some derivative or summary form of the results (e.g., averages, interpolations, etc.) can be saved for later use according to the requirements of the operational setting.

8. Additional Embodiments

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., monitor, keyboard, disk drive, Internet connection, etc.). However, the computer may include circuitry or other specialized hardware for carrying out some or all aspects of the method. In some operational settings, the apparatus may be configured as a system that includes one or more units, each of which is configured to carry out some aspects of the method either in software, in hardware or in some combination thereof. At least some values based on the results of the method can be saved, either in memory (e.g., RAM (Random Access Memory)) or permanent storage (e.g., a hard-disk system) for later use Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

9. References

The following references are related to the disclosed subject matter:

[1] C. Visweswariah, K. Ravindran, K. Kalafala, S. G. Walker, and S. Narayan. First-order incremental block-based statistical timing analysis. In *Proceedings of the ACM/IEEE Design Automation Conference*, pages 331-336, San Diego, Calif., June 2004.

[2] Aseem Agarwal, David Blaauw, and Vladimir Zolotov. Statistical Timing Analysis using Bounds and Selective enumeration. *IEEE Transaction on CAD*, 22:1243-1260, September 2003.

[3] H. Chang and S. S. Sapatnekar. Statistical Timing Analysis Considering Spatial Correlations using a Single Pert-like Traversal. In *Proceedings of The International Conference on Computer Aided-Design*, pages 621-625, San Jose, Calif., November 2003.

[4] R. Telichevesky and K. Kundert and J. White, "Efficient AC and noise analysis of two-tone RF circuits," *Proceedings of 33rd Design Automation Conference*, Las Vegas, Nev., June 1996.

[5] Lou Scheffer. Explicit Computation of Performance as a Function of Process Variation. In *International Workshop on Timing Issues in the Specification and Synthesis of Digital Systems*, Monterey, Calif., December 2002.

[6] Aniruhd Devgan and Chandramouli Kashyap. Block-based Static Timing Analysis with Uncertainty. In *Proceedings of The International Conference on Computer Aided-Design*, pages 607-614, San Jose, Calif., November 2003.

[7] Aseem Agarwal, David Blaauw, and Vladimir Zolotov. Statistical clock skew Analysis considering intradie-process variations. *IEEE Transaction on CAD*, 23:1231-1241, August 2004.

[8] J. Wang, P. Ghanta, and S. Vrudhula. Stochastic analysis of interconnect performance in the presence of process variations. In *International Conference on Computer Aided-Design*, pages 880-886, San Jose, Calif., November 2004.

[9] Joel R. Phillips. Variational interconnect analysis via PMTBR. In *International Conference on Computer Aided-Design*, pages 872-879, San Jose, Calif., November 2004.

[10] X. Li, P. Li, and L. Pileggi. Parameterized interconnect order reduction with Explicit-and-Implicit multi-Parameter moment matching for Inter/Intea-Die variations. In *International Conference on Computer Aided-Design*, pages 806-812, San Jose, Calif., November 2005.

[11] James D. Ma and Rob A. Rutenbar. Interval-valued reduced order statistical interconnect modeling. In *Proc. Int. Conf. on Computer Aided Design*, 2004.

[12] Z. Wang, R. Murgai, and J. Roychowdhury. ADAMIN: Automated, accurate macomodelling of digital aggressors for power and ground supply noise prediction. *IEEE Transaction on CAD*, 24:56-64, January 2005 2005.

[13] K. Okada, K. Yamaoka, and H. Onodera. A statistical gate-delay model considering intra-gate variability. In *Proceedings of The International Conference on Computer Aided-Design*, pages 908-913, San Jose, Calif., November 2003.

[14] A. Papoulis. *Probability, random variables, and stochastic processes*. McGraw Hill, New York, 1991.

[15] Roger A. Horn and Charles R. Johnson. *Matrix Analysis*. Cambridge University Press, Cambridge, 1985.

[16] Joel R. Phillips. Projection-based approaches for model reduction of weakly nonlinear, time-varying systems. *IEEE Trans. Computer-Aided Design*, 22:171-187, 2003.

[17] L. Scheffer, L. Luciano and G. Martin, eds., *EDA for IC Implementation, Circuit Design, and Process Technology*, Chapter 14, Simulation of Analog and RF Circuits and Systems, by J. Roychowdhury and A. Mantooth, pages 14-1 to 14-38, CRC Press, 2006.

[18] M. J. M. Pelgrom, Aad C. J. Duinmaijer and Anton P. G. Welbers, "Matching Properties of MOS Transistors," IEEE Journal of Solid-State Circuits, vol. 24, no. 5, October 1989, pp. 1433-1440.

[19] Francesco Forti and Michael E. Wright, "Measurement of MOS Current Mismatch in the Weak Inversion Region," IEEE Journal of Solid-State Circuits, vol. 29, no. 2, February 1994, pp. 138-142.

What is claimed is:

1. A method of simulating parametric variations in an integrated circuit (IC) comprising:
    specifying an IC model, wherein the IC model includes one or more parameters for variation about a nominal condition;
    calculating parametric perturbations about the nominal condition, wherein calculating the parametric perturbations includes:
        simulating the nominal condition for the IC;
        determining perturbation values for the IC model about the nominal conditions, wherein the perturbation values include linear time-varying matrices and parametric right-hand sides, the parametric right-hand sides characterizing an effect of the parametric perturbations in the IC model;
        determining a performance metric for the IC and a performance sampling vector for sampling the performance metric about the nominal condition from the perturbation values; and
        determining voltage-sensitivity values and performance-sensitivity values from the perturbation values and the performance-sampling vector; and
    saving one or more values for the parametric perturbations in a computer-readable medium.

2. A method according to claim 1, wherein the performance metric measures delay for a waveform and the performance sampling vector samples waveform values to measure the delay.

3. A method according to claim 1, wherein simulating the nominal condition for the IC includes approximating IC behavior on a discrete temporal grid.

4. A method according to claim 1, wherein the linear time-varying matrices include capacitance values and conductance values.

5. A method according to claim 1, wherein the parametric right-hand sides include source functions corresponding to parametric variations.

6. A method according to claim 1, wherein the performance-sampling vector corresponds to a reference voltage value that crosses a threshold voltage value.

7. A method according to claim 1, wherein determining the voltage sensitivity values and performance sensitivity values includes solving a system that relates values of the linear time-varying matrices to the parametric right-hand sides.

8. A method according to claim 1, wherein calculating the parametric perturbations further comprises: determining a performance value from the performance sensitivity.

9. A method according to claim 1, wherein
    the perturbation values for the IC model include a first-order system that is driven by source functions that correspond to the parametric perturbations and a second-order system that is driven by a solution of the first-order system; and determining the voltage-sensitivity values includes solving the first-order system for a first-order voltage sensitivity and using the first-order voltage sensitivity to solve the second-order system for a second-order voltage sensitivity.

10. A method according to claim 1, wherein
the perturbation values for the IC model include a first-order system that is driven by source functions that correspond to the parametric perturbations and a second-order system that is driven by a solution of the first-order system; and
determining the performance-sensitivity values includes solving the first-order system for a first-order voltage sensitivity, solving an adjoint first-order system for a performance-sampling sensitivity corresponding to the performance-sampling vector, and calculating a second-order performance sensitivity by using the second-order system to combine the first-order voltage sensitivity and the performance-sampling sensitivity.

11. An apparatus for simulating parametric variations in an integrated circuit (IC), the apparatus comprising a computer for executing computer instructions, wherein the computer includes computer instructions for:
specifying an IC model, wherein the IC model includes one or more parameters for variation about a nominal condition;
calculating parametric perturbations about the nominal condition, wherein calculating the parametric perturbations includes:
simulating the nominal condition for the IC;
determining perturbation values for the IC model about the nominal conditions, wherein the perturbation values include linear time-varying matrices and parametric right-hand sides, the parametric right-hand sides characterizing an effect of the parametric perturbations in the IC model;
determining a performance metric for the IC and a performance sampling vector for sampling the performance metric about the nominal condition from the perturbation values; and
determining voltage-sensitivity values and performance-sensitivity values from the perturbation values and the performance-sampling vector; and
saving one or more values for the parametric perturbations.

12. An apparatus according to claim 11, wherein the computer includes a processor with memory for executing at least some of the computer instructions.

13. An apparatus according to claim 11, wherein the computer includes circuitry for executing at least some of the computer instructions.

14. An apparatus according to claim 11, wherein the performance metric measures delay for a waveform and the performance sampling vector samples waveform values to measure the delay.

15. An apparatus according to claim 11, wherein
the perturbation values for the IC model include a first-order system that is driven by source functions that correspond to the parametric perturbations and a second-order system that is driven by a solution of the first-order system; and
determining the voltage-sensitivity values includes solving the first-order system for a first-order voltage sensitivity and using the first-order voltage sensitivity to solve the second-order system for a second-order voltage sensitivity.

16. An apparatus according to claim 11, wherein
the perturbation values for the IC model include a first-order system that is driven by source functions that correspond to the parametric perturbations and a second-order system that is driven by a solution of the first-order system; and
determining the performance-sensitivity values includes solving the first-order system for a first-order voltage sensitivity, solving an adjoint first-order system for a performance-sampling sensitivity corresponding to the performance-sampling vector, and calculating a second-order performance sensitivity by using the second-order system to combine the first-order voltage sensitivity and the performance-sampling sensitivity.

17. A non-transitory computer-readable medium that stores a computer program for simulating parametric variations in an integrated circuit (IC), wherein the computer program includes instructions for:
specifying an IC model, wherein the IC model includes one or more parameters for variation about a nominal condition;
calculating parametric perturbations about the nominal condition, wherein calculating the parametric perturbations includes:
simulating the nominal condition for the IC;
determining perturbation values for the IC model about the nominal conditions, wherein the perturbation values include linear time-varying matrices and parametric right-hand sides, the parametric right-hand sides characterizing an effect of the parametric perturbations in the IC model;
determining a performance metric for the IC and a performance sampling vector for sampling the performance metric about the nominal condition from the perturbation values; and
determining voltage-sensitivity values and performance-sensitivity values from the perturbation values and the performance-sampling vector; and
saving one or more values for the parametric perturbations.

18. A non-transitory computer-readable medium according to claim 17, wherein the performance metric measures delay for a waveform and the performance sampling vector samples waveform values to measure the delay.

19. A non-transitory computer-readable medium according to claim 17, wherein
the perturbation values for the IC model include a first-order system that is driven by source functions that correspond to the parametric perturbations and a second-order system that is driven by a solution of the first-order system; and
determining the voltage-sensitivity values includes solving the first-order system for a first-order voltage sensitivity and using the first-order voltage sensitivity to solve the second-order system for a second-order voltage sensitivity.

20. A non-transitory computer-readable medium according to claim 17, wherein
the perturbation values for the IC model include a first-order system that is driven by source functions that correspond to the parametric perturbations and a second-order system that is driven by a solution of the first-order system; and
determining the performance-sensitivity values includes solving the first-order system for a first-order voltage sensitivity, solving an adjoint first-order system for a performance-sampling sensitivity corresponding to the performance-sampling vector, and calculating a second-order performance sensitivity by using the second-order system to combine the first-order voltage sensitivity and the performance-sampling sensitivity.

21. A method according to claim 1, wherein the voltage sensitivity values characterize voltage responses that correspond to the parametric perturbations and the performance-sensitivity values characterize performance responses that correspond to the parametric perturbations.

22. A method according to claim 1, further comprising:
using the performance-sensitivity values to transform an uncertainty characterization for the one or more parameters to an uncertainty characterization for the performance metric.

23. A method according to claim 1, wherein the performance metric measures an energy value for a waveform and the performance sampling vector samples waveform values to measure the energy value.

* * * * *